Feb. 3, 1959  G. C. ELLERBECK  2,872,115
MULTIPLYING CALCULATOR
Filed May 31, 1955  15 Sheets-Sheet 1

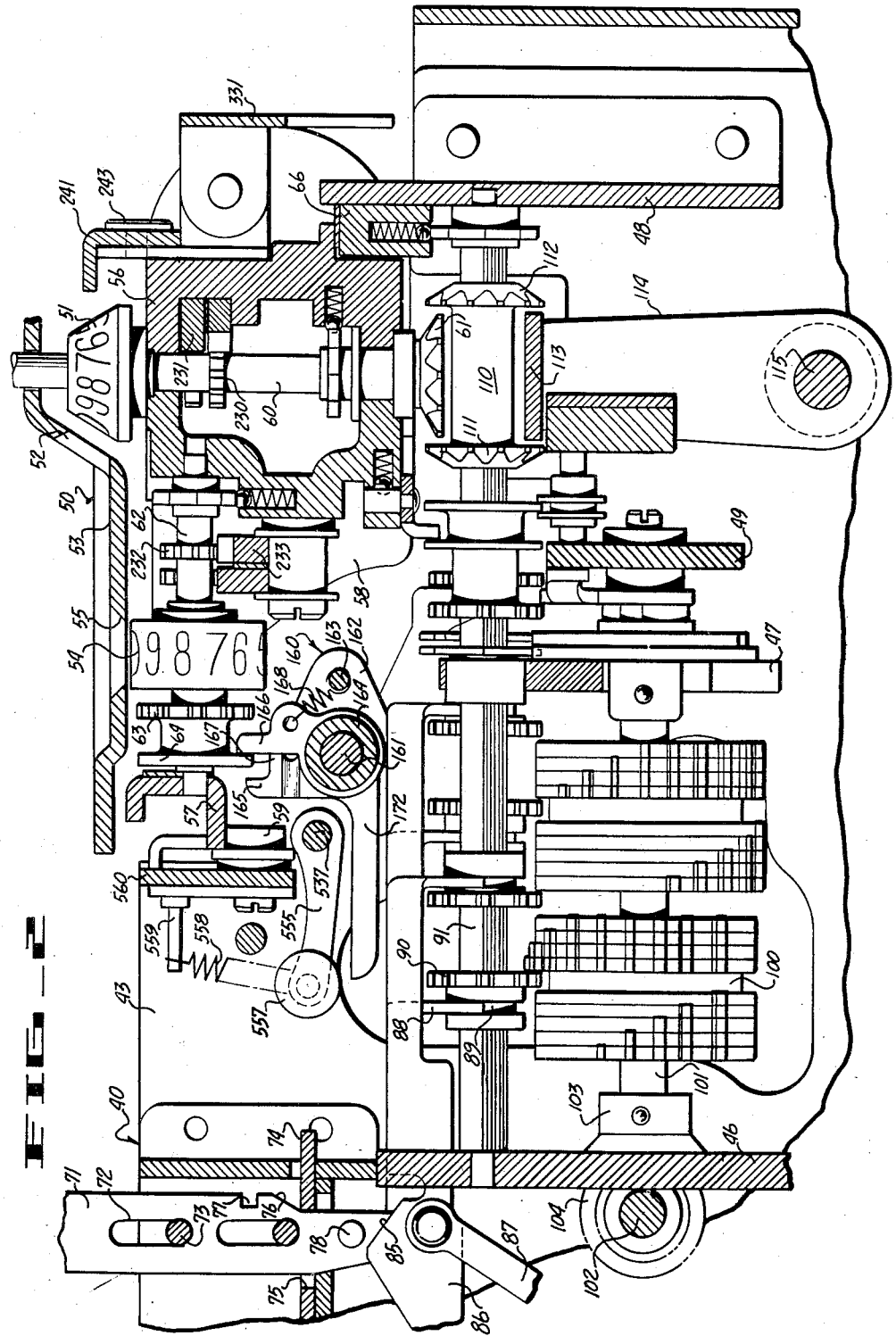

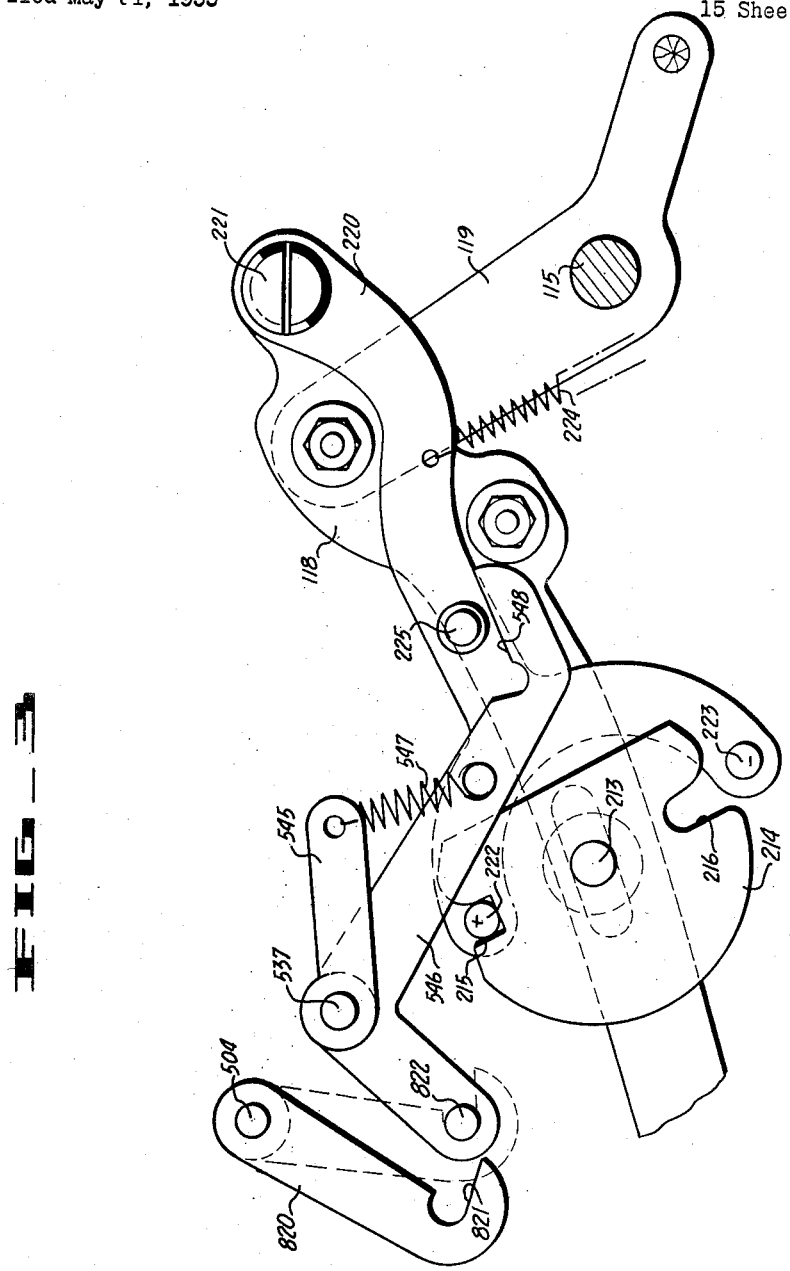

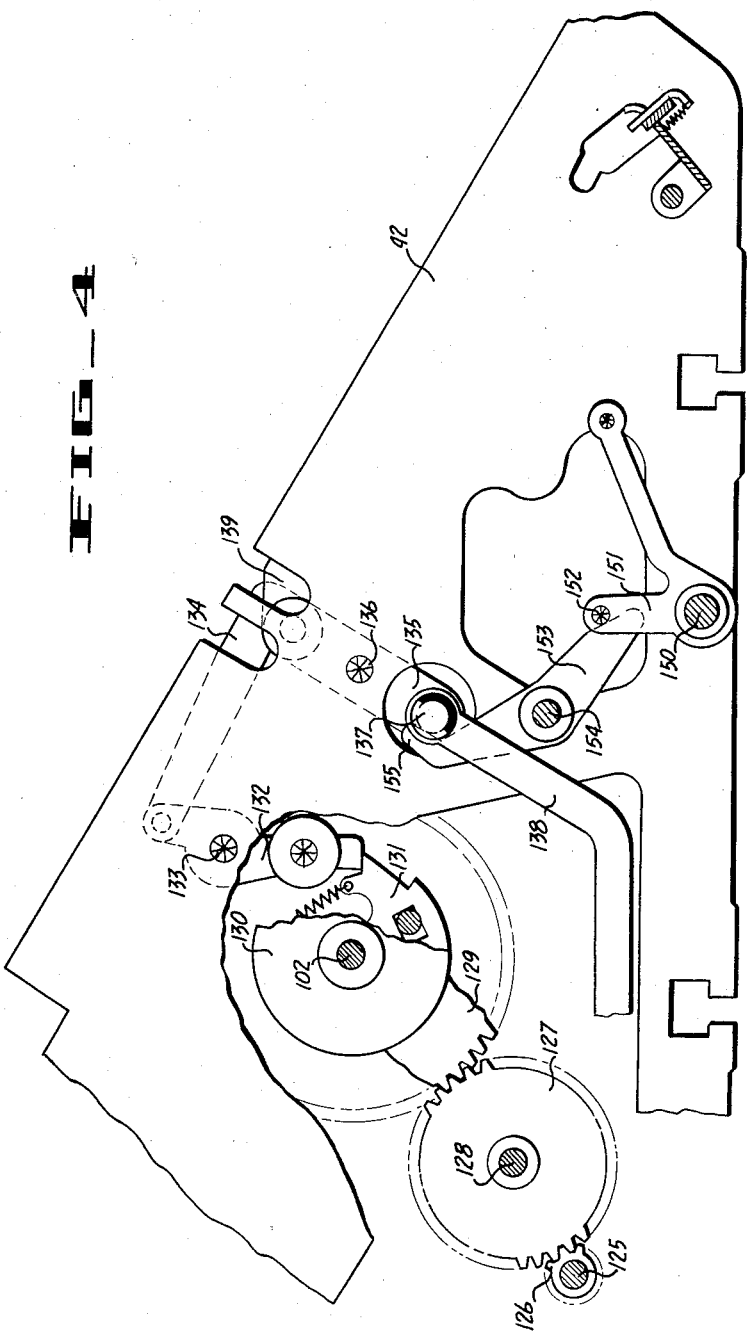

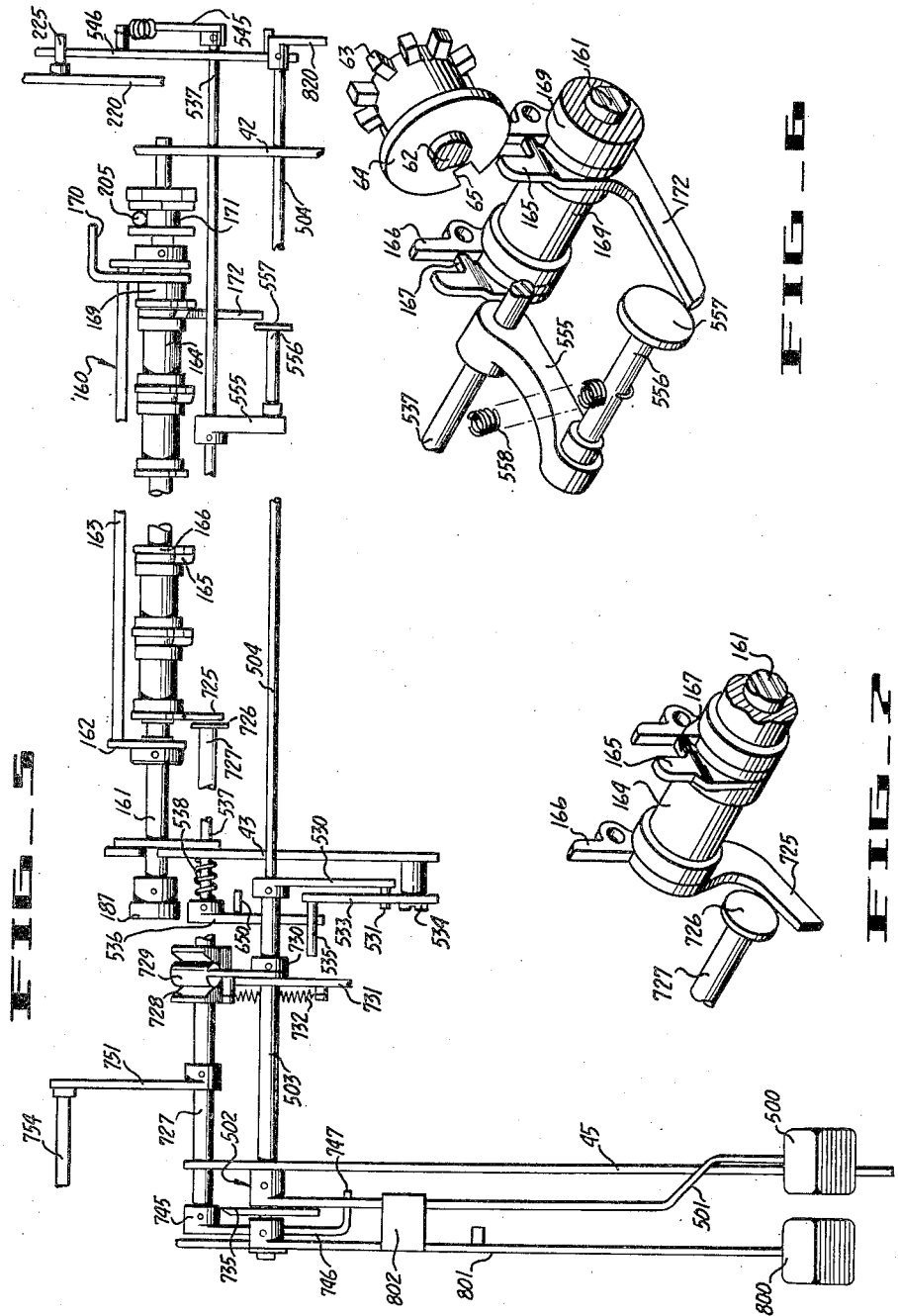

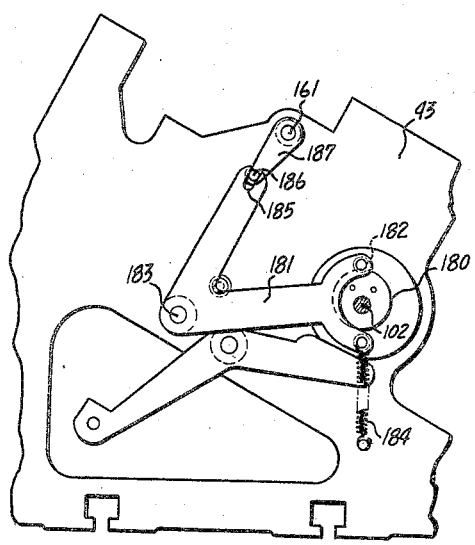
FIG_8
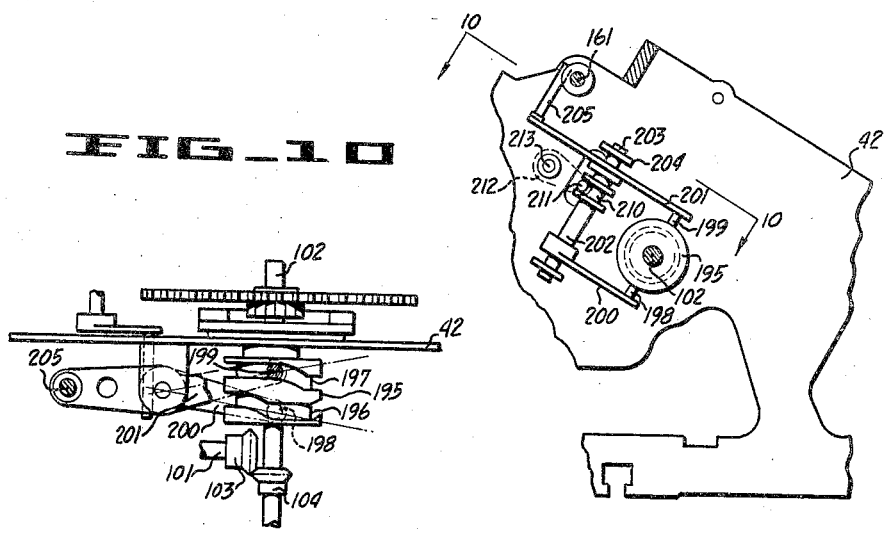
FIG_9
FIG_10

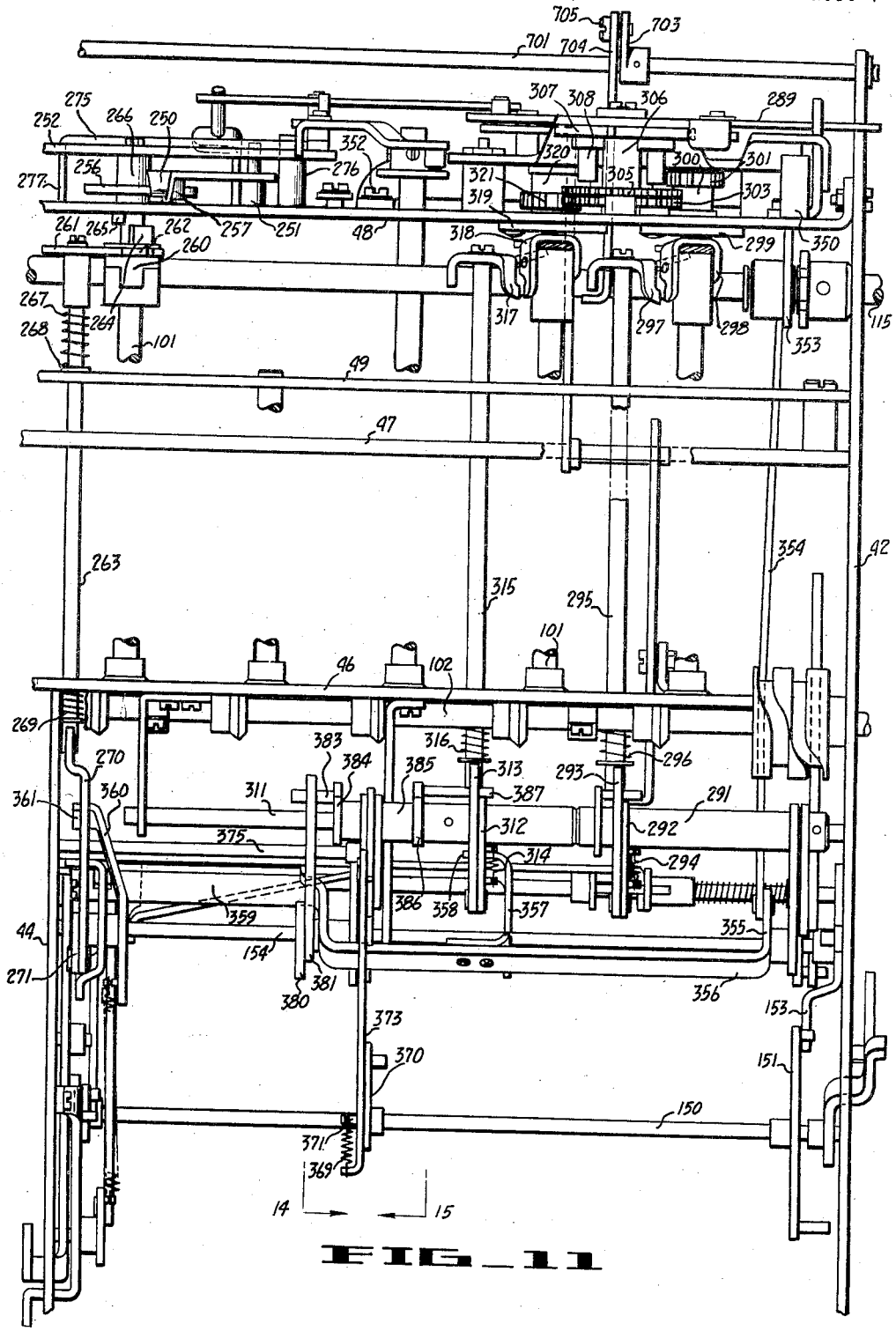
FIG_11

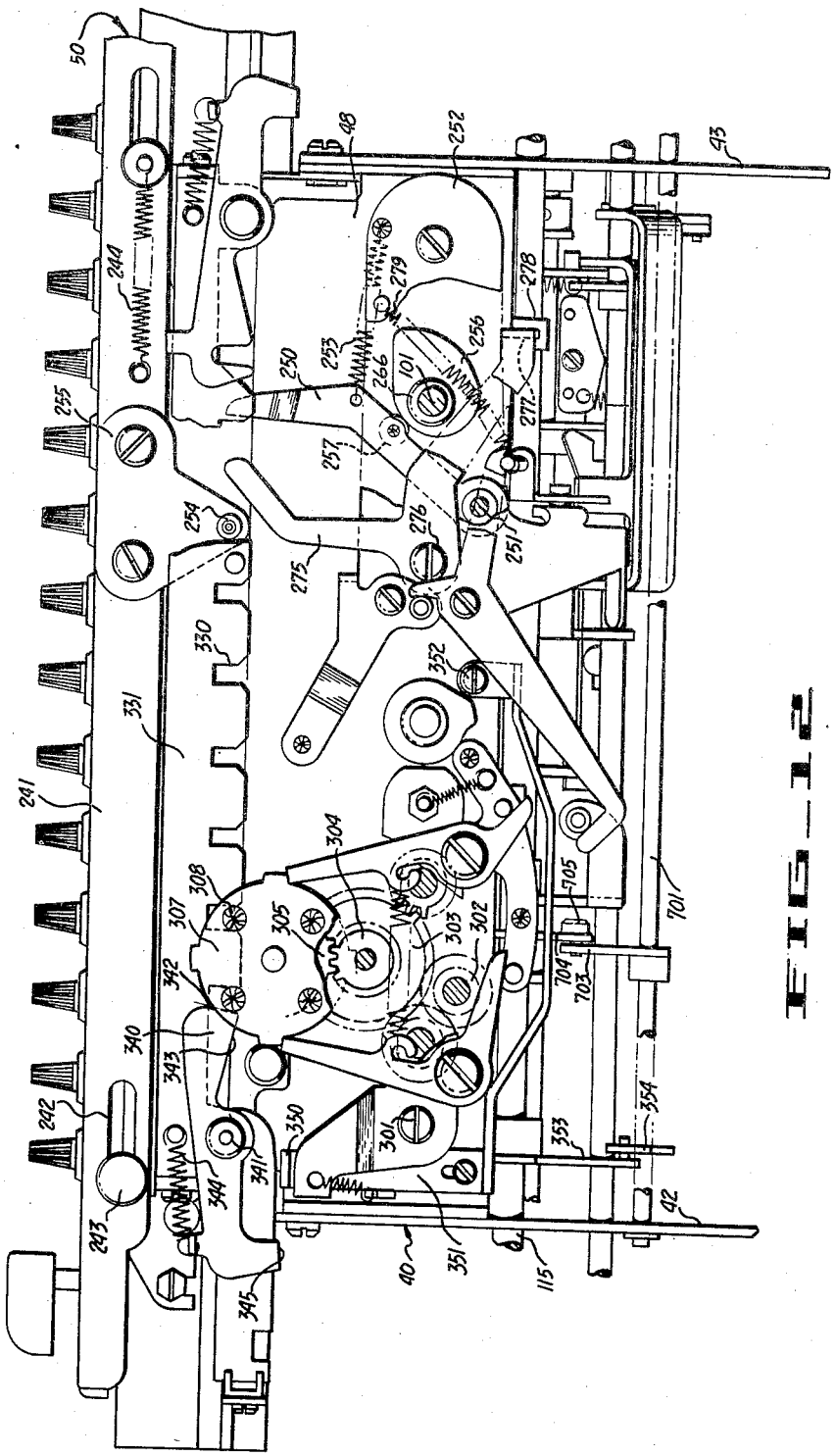

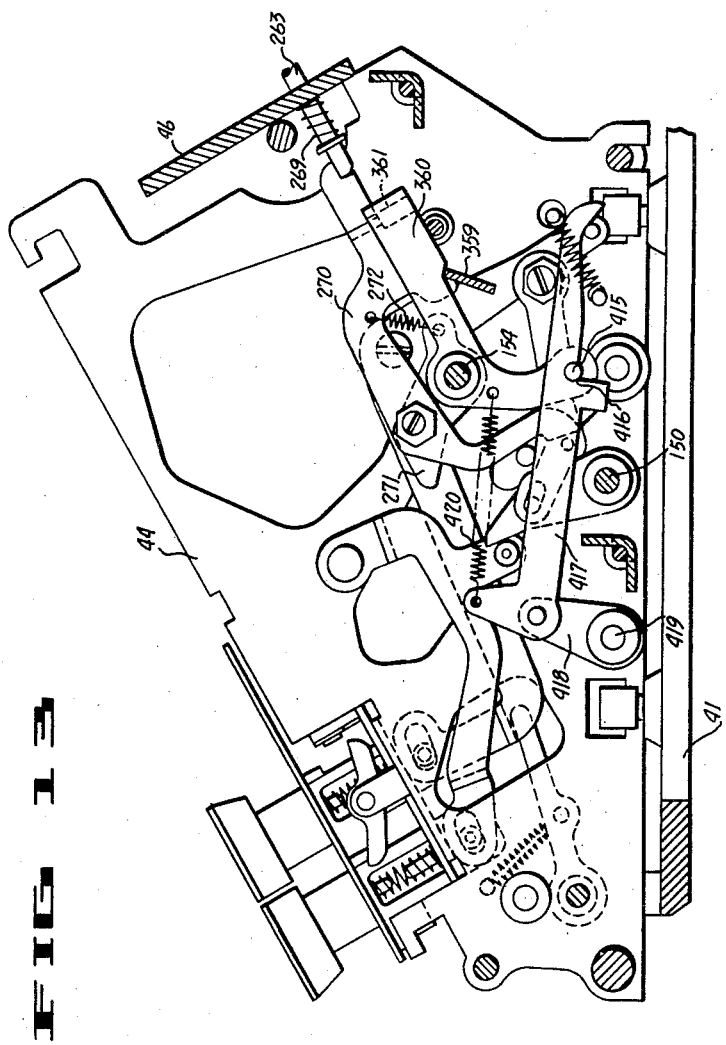

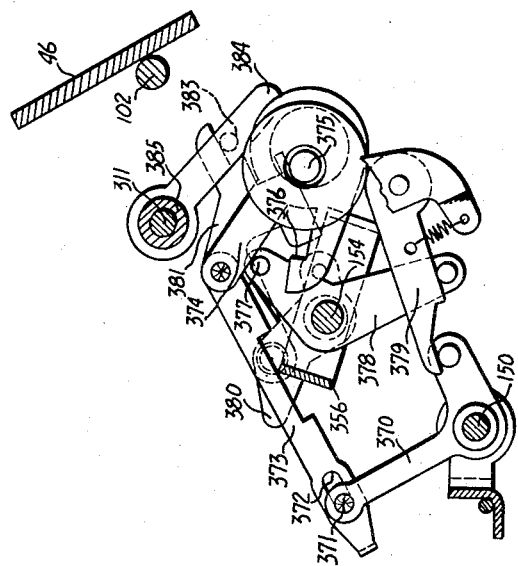
FIG_15
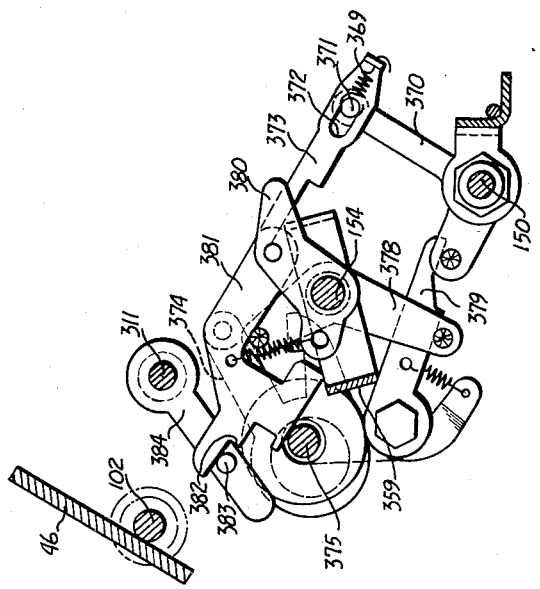
FIG_14

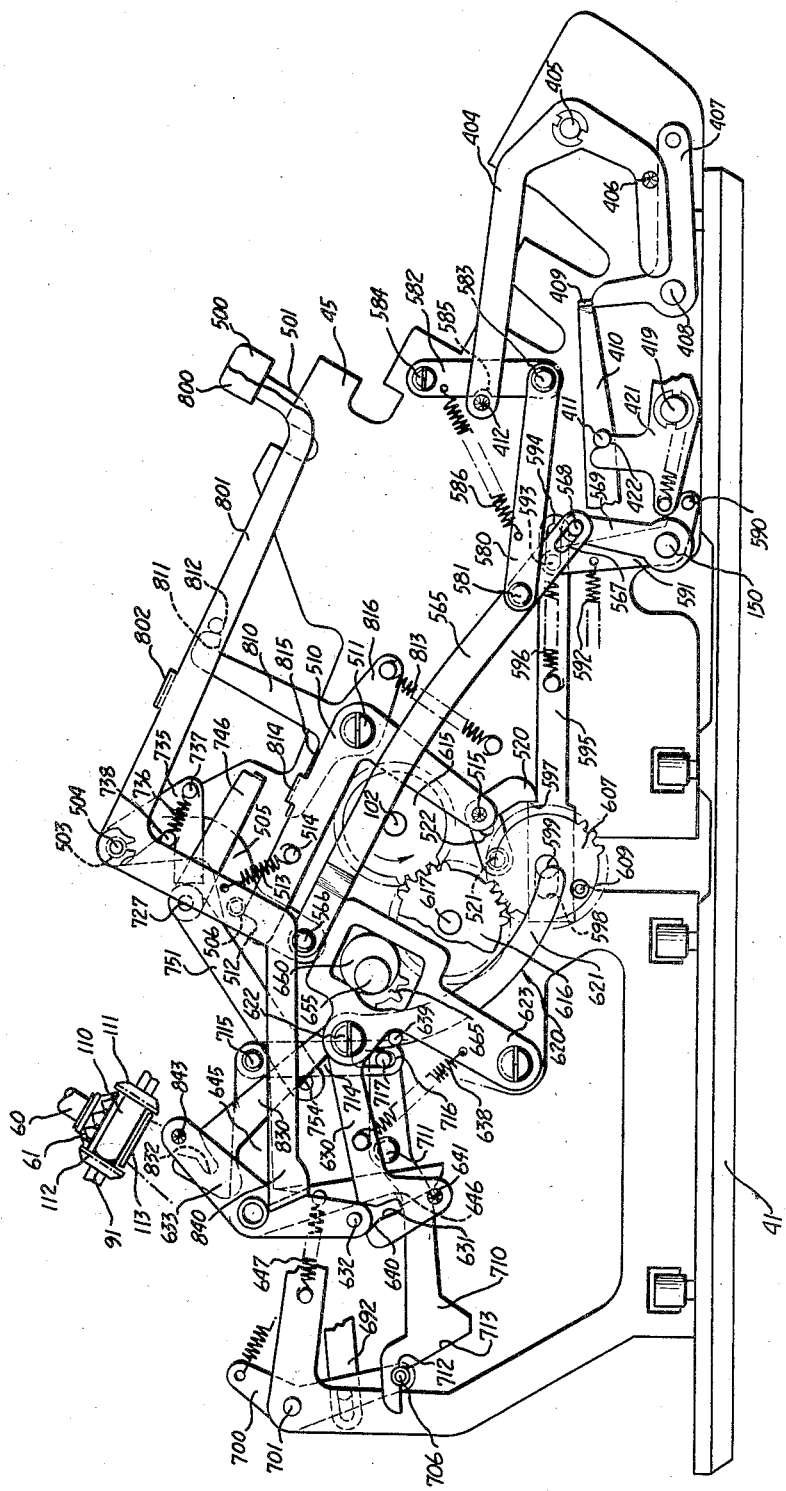

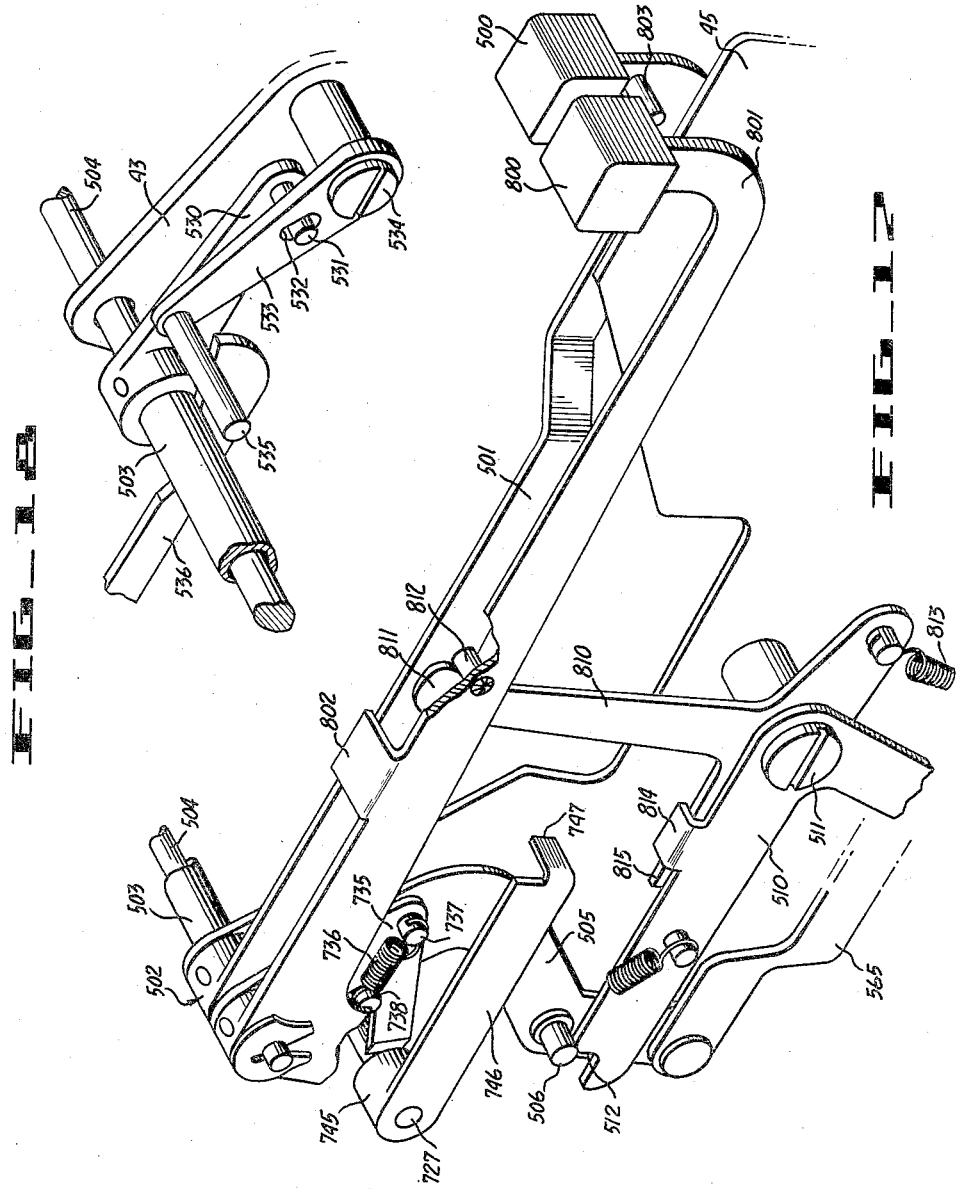

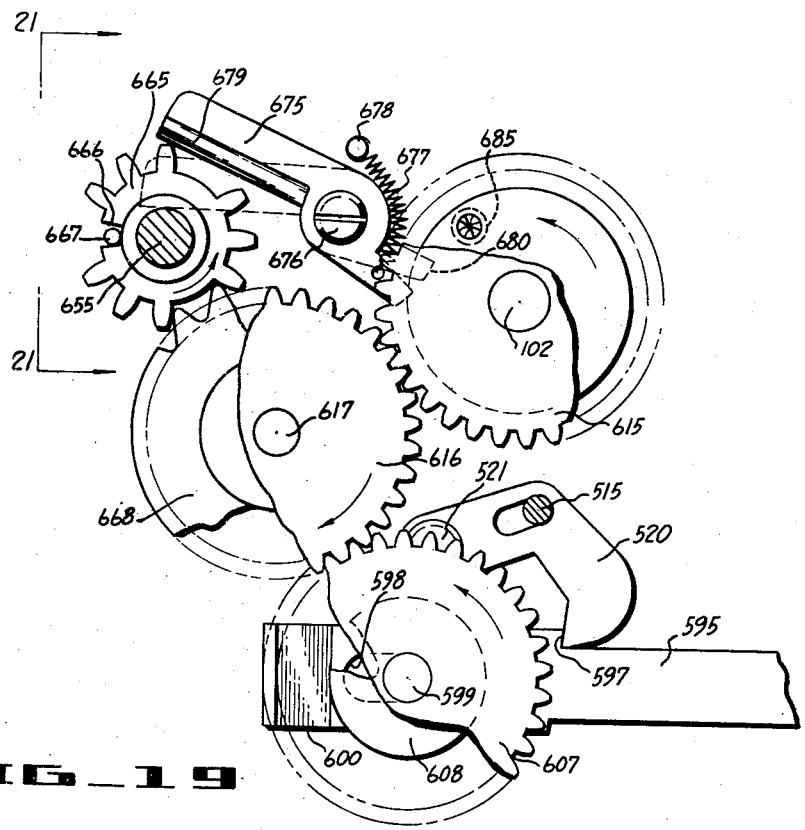
FIG_19
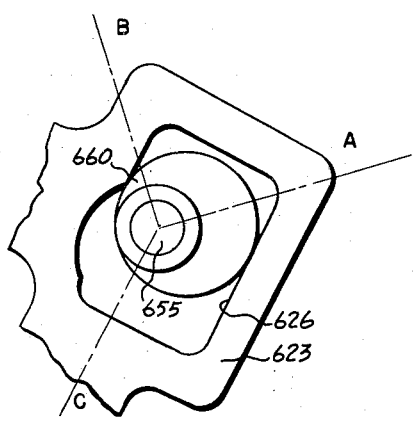
FIG_20
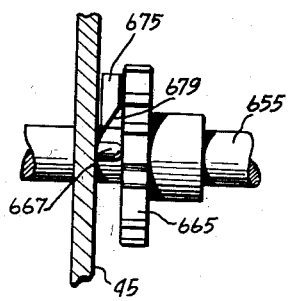
FIG_21

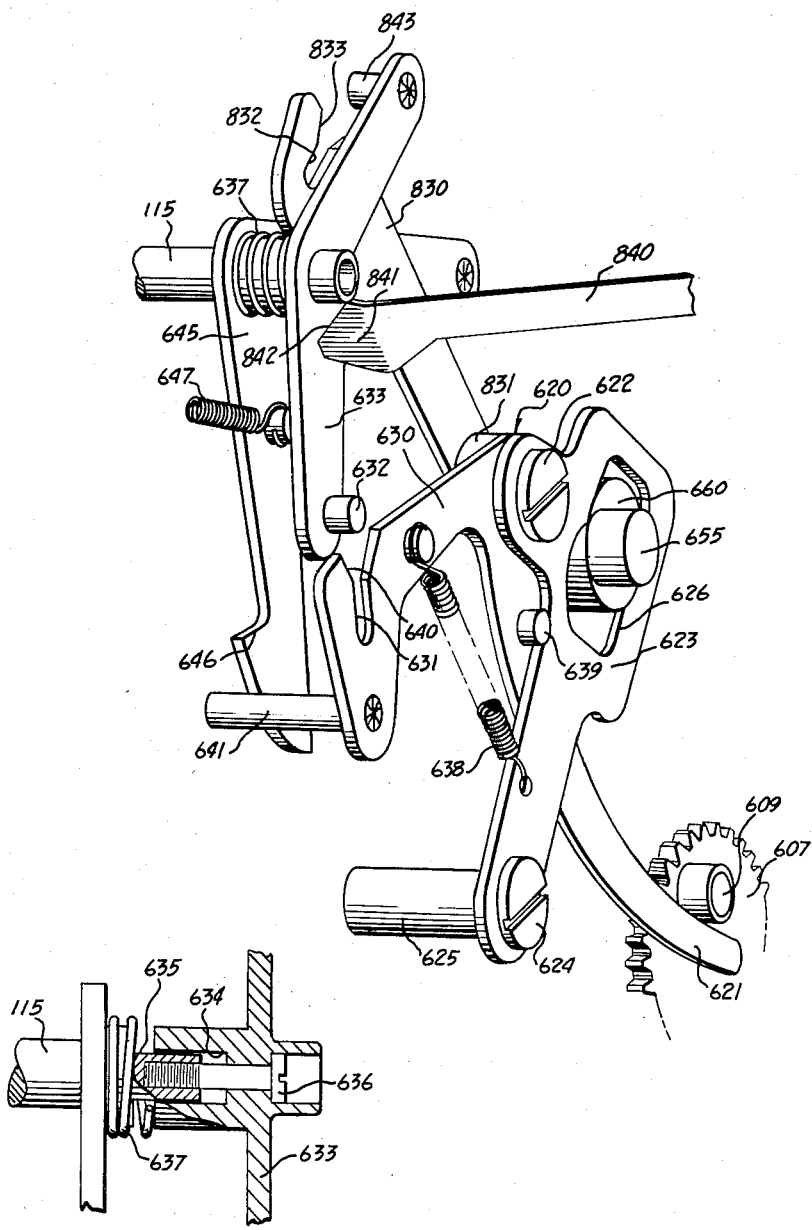

Feb. 3, 1959     G. C. ELLERBECK     2,872,115
MULTIPLYING CALCULATOR
Filed May 31, 1955     15 Sheets-Sheet 15
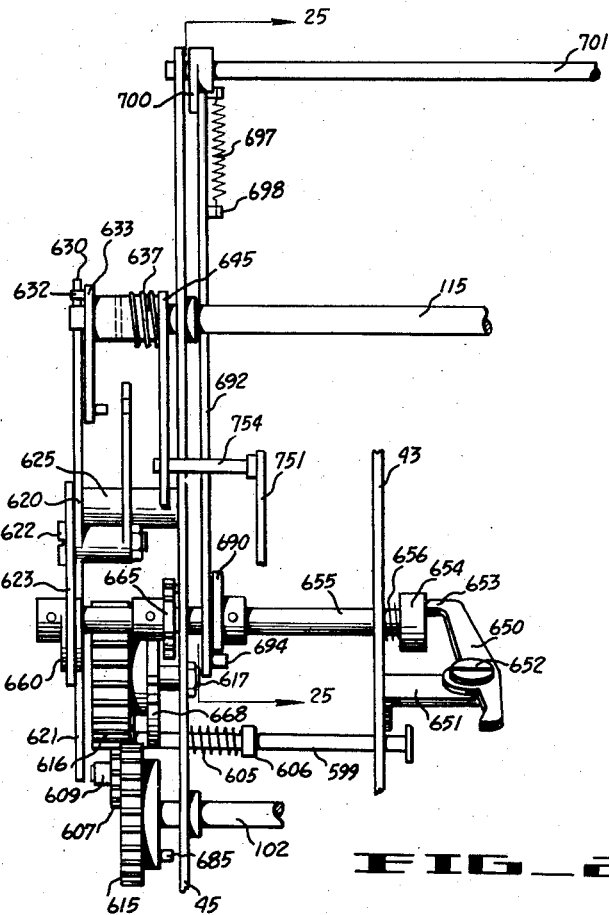
FIG_24
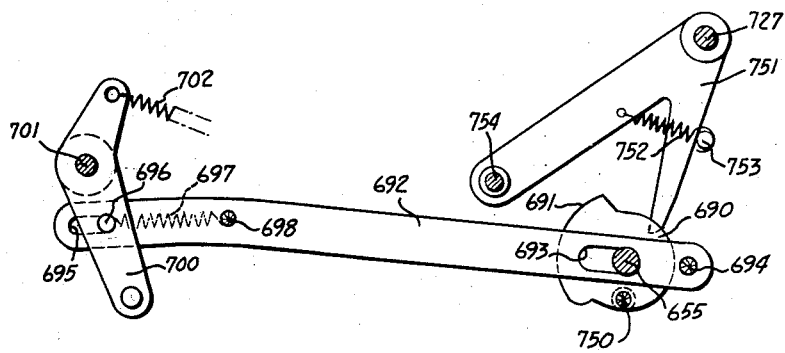
FIG_25

United States Patent Office 2,872,115
Patented Feb. 3, 1959

2,872,115

MULTIPLYING CALCULATOR

Grant C. Ellerbeck, San Leandro, Calif., assignor to Friden, Inc., a corporation of California Application May 31, 1955, Serial No. 512,260

15 Claims. (Cl. 235—63)

INDEX

| | Column |
|---|---|
| I. Conventional Mechanisms | 3 |
|    A. Machine Frame | 3 |
|    B. Carriage | 4 |
|    C. Selection Mechanism | 4 |
|    D. Accumulator Drive | 5 |
|    E. Drive Clutch | 6 |
|    F. Revolutions Counter Actuator | 7 |
|    G. Register Clearing Mechanisms | 11 |
|    H. Carriage Shift | 13 |
|    I. Left Shift Terminating Mechanism | 14 |
|    J. Shift and Clear Programming Mechanism | 16 |
|    K. Multiplication Mechanism | 17 |
|    L. Division Mechanism | 19 |
| II. Counter Multiplier Mechanism | 19 |
|    1. Theory of Operation | 19 |
|    2. Multiplier Control Key (Positive) | 21 |
|    3. Counter Control | 22 |
|    4. Condition Transfer Sensing Control | 23 |
|    5. Initiate Machine Operation | 24 |
|    6. Multiplier Interlock | 24 |
|    7. Setting Digitation Control Gate | 25 |
|    8. Programming Mechanism | 28 |
|    9. Shift Interlock | 32 |
|    10. Operation Terminating Mechanism | 33 |
|    11. Complementary Multiplication | 35 |

This invention relates to a calculating machine, and particularly to a multiplying mechanism therefor.

A primary object of the present invention is to provide a mechanism for a rotary calculator which is selectively effective to multiply a factor standing in the selection mechanism thereof by a factor standing in the counter, or quotient register, of the machine.

It is often desirable to utilize a quotient derived from the solution of one problem as a multiplier factor in a succeeding problem. Heretofore, in conventional machines available on the market, it has been necessary to manually set the quotient so derived into the multiplier unit of the calculating machine, with the chance of error arising from such manual operations. My present invention is designed to automatically and directly use the quotient register as the multiplier control unit. Such an invention enables an operator, after securing the quotient, to proceed directly with the multiplication. It is necessary only to insert the multiplicand in the keyboard of the machine and depress a control key, for the mechanism of my invention operates quickly and automatically to multiply the factor so set in the keyboard by the quotient appearing in the counter.

Another object of the present invention is to design a simplified multiplier mechanism, and particularly one utilizing a factor set into the counter, or quotient register, as a multiplier without interfering in any way with the conventional mechanisms of the machine, and especially the multiplying mechanism thereof. It will be understood, of course, that the multiplier unit of the present invention could be substituted for, and used in lieu of, the conventional multiplying mechanism of presently known machines. However, it is contemplated that a better use of the present invention would be in addition to, and not in substitution for, the present multiplying devices of calculating machines.

Another object of the present invention is to provide a multiplying mechanism more simple and positive in its operation than those now in use in various calculating machines.

These and other objects of the present invention will be apparent from the following description of the preferred embodiment of the invention which is shown in the accompanying drawings, and in which:

Fig. 2 is a longitudinal cross-sectional view through the actuating and registering mechanism, showing particularly a right end view of the counter multiplier mechanism of the present invention.

Fig. 3 is an enlarged detail taken from the right of the conventional counter control mechanism of the machine shown in Fig. 1, and especially the counter control means associated with the present invention.

Fig. 4 is a left-hand view of the conventional drive mechanism of the machine shown in Fig. 1, and a portion of the controls therefor.

Fig. 5 is a detailed plan view of the counter actuating mechanisms and the control devices of the present invention.

Fig. 6 is an enlarged detail of the mechanisms of the two right-hand orders of the counter actuator.

Fig. 7 is an enlarged detail of the highest order counter actuator.

Fig. 8 is a left-hand view of the counter actuator showing specifically means for rocking the actuator shaft.

Fig. 9 is a left-hand view, partly in section, showing another portion of the counter actuating mechanism and specifically the means for translating the actuator axially.

Fig. 10 is a plan view of the mechanism shown in Fig. 9.

Fig. 11 is a plan view of certain control mechanisms of the preferred machine with which the present invention is associated, and shows particularly the shifting and clearing mechanisms, and means for operating the same.

Fig. 12 is a rear view of the machine with which the present invention is associated.

Fig. 13 is a right-hand view taken to the left of the keyboard and showing certain control mechanisms for the clear clutch and the initiation of multiplication operations, such a view being taken along a plane substantially that indicated by the line 13—13 of Fig. 1.

Figs. 14 and 15 are a left-hand and right-hand view, respectively, of the power-operated programming mechanism for causing a shift of the carriage to an extreme position and a clearing of the counter register or the accumulator, or both, in that position.

Fig. 16 is a left-hand view of the control mechanisms of the present invention which are mounted on the left-hand side of the left-hand control plate, and can be considered as superimposed upon the conventional multiplying mechanism of the "Friden" calculating machine, such as is shown in Fig. 11 of Friden patent, No. 2,399,917, of May 7, 1946.

Fig. 17 is an enlarged detailed view, taken in perspective, of the control keys of the present invention.

Fig. 18 is an enlarged detailed view, taken in perspective, of the control mechanism associated with the mechanism of Fig. 17 and, in effect, is a rightward extension of Fig. 17.

Fig. 19 is an enlarged detailed view, taken from the left, showing the programming mechanism of the present invention.

Fig. 20 is an enlarged detail of the program cam and the cam follower, illustrating the three operative positions of the latter, the cam being mounted on the left end of the control shaft 655 on which the mutilated program gear 665 (Fig. 19) is mounted.

Fig. 21 is a rear view of the mutilated program gear and associated parts, such as a view taken along the plane indicated by the line 21—21 of Fig. 19.

Fig. 22 is an enlarged detailed view, taken in perspective, of the setting mechanism of the present invention.

Fig. 23 is an enlarged detail, in cross-section, showing a preferred form of mounting the control arm which is effective to control the sign character of registration during operations, under the present invention.

Fig. 24 is a plan view of the operating mechanisms shown in detail in Figs. 19 to 23, inclusive.

Fig. 25 is a detail of the means for controlling shifting of the carriage, taken from the left on a plane to the right of the control plate, as indicated by the line 25—25 of Fig. 24.

I. CONVENTIONAL MECHANISMS

Figure 1:
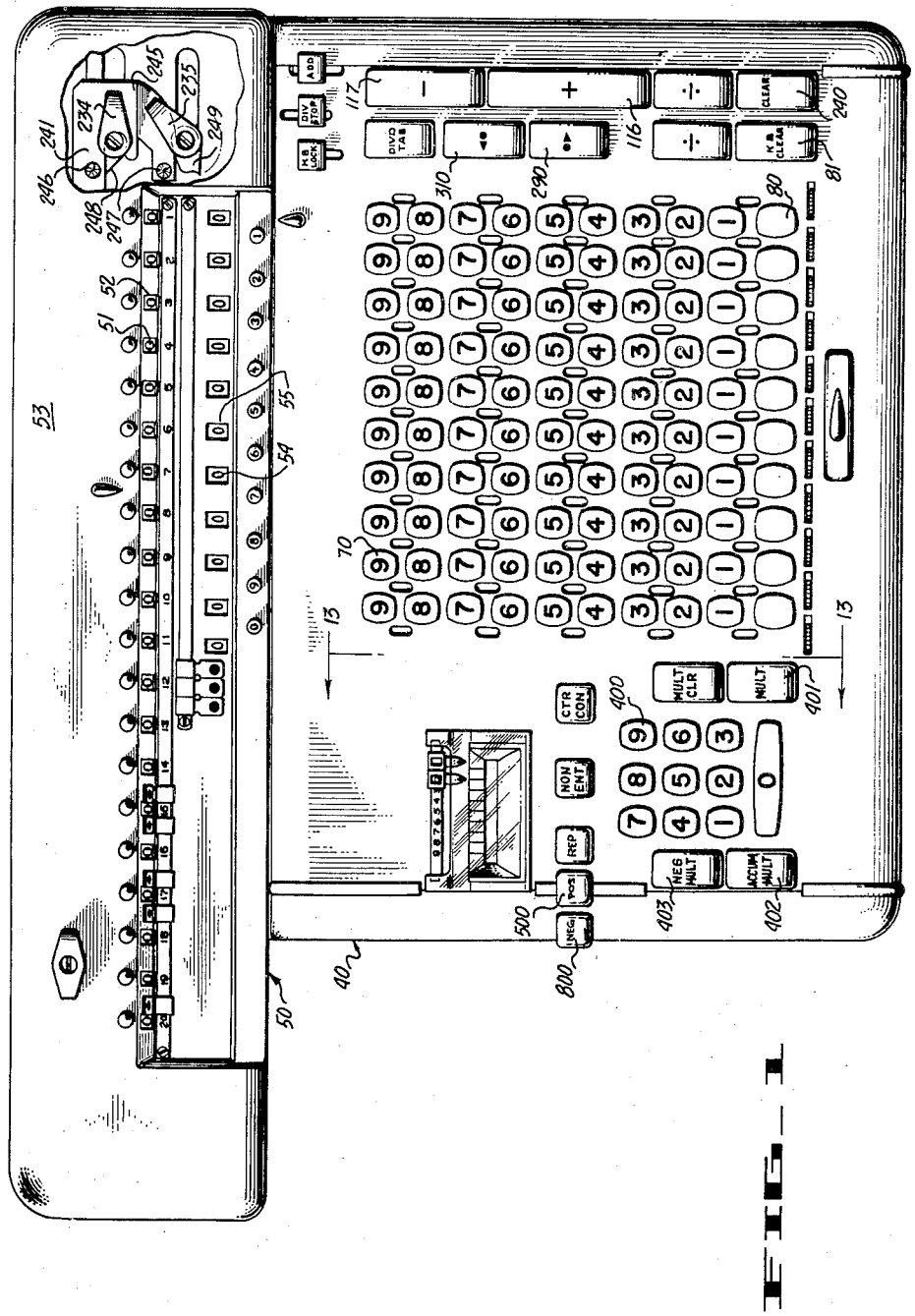
Fig. 1 is a plan view of a preferred type of machine with which the present invention is associated, with a portion of the carriage broken away to show parts of the clearing mechanism.

The present invention will be illustrated as applied to a calculating machine of the type disclosed in the patent to Friden, No. 2,229,889, of January 28, 1941. However, it will be understood by those familiar with the art that this invention could readily be applied to any other calculating machine currently on the market, with very slight modifications in the structure of the multiplying mechanism. It will be understood, therefore, that the machine shown in the accompanying drawings and described herein, is for the purposes of exemplification only, and that this invention is not limited thereto.

Fig. 1 of the drawings illustrates a multiplier mechanism of the type described in the patents to Friden, No. 2,371,752, of March 20, 1945, and No. 2,399,917, of May 7, 1946, as will be apparent to those familiar with calculating machines now available on the market. However, the multiplying mechanisms of these two last-mentioned patents are not pertinent to the present invention for, as mentioned previously, the multiplying mechanism of the present invention can be used either in substitution for, or in addition to, the multiplying mechanism of those patents. For purposes of exemplification, the present invention is shown herein as being in addition to that multiplication apparatus, which will not be described herein other than to mention an interlock to prevent operation of both multiplying mechanisms simultaneously.

A. *Machine frame*

Machines of this type are generally constructed in two sections: A frame portion 40 and a shiftable register carriage 50, as shown particularly in Fig. 1. The frame 40 carries the selection mechanism, the actuators and the drive mechanism therefor, and various control keys, as shown, as well as means for shifting the carriage 50. The carriage 50 contains an ordinally arranged accumulator register comprising accumulator dials 51, which are viewable through windows 52 in the carriage cover 53; and a counter register, or quotient register, including the ordinally arranged counter dials 54 which are viewable through windows 55 in the cover. The carriage is shiftable with respect to the frame 40, so that the various orders of the accumulator dials 51 and counter dials 54 can be aligned with different orders of the selection mechaism for such operations as multiplication or division.

The base portion of the machine comprises a base plate 41 (Figs. 13 and 16), a right side frame 42 (Figs. 4, 11, and 12), a left side frame 43 (Figs. 2, 5, 8, and 12), a left side auxiliary bracket 44 (Figs. 11 and 13), and a left side control plate 45 (Figs. 5 and 16), and various crossframe members such as the crossframe bars 46, 47 and 48 (Fig. 2). For the most part, the various operating and control mechanisms are mounted on the frame members just mentioned, the whole forming a rigid frame for the support of the various mechanisms, including the carriage.

B. *Carriage*

The carriage 50 includes a main frame bar 56 (Fig. 2), in which is journalled a plurality of ordinally arranged dial shafts 60. The various accumulator dials 51 are mounted on the upper end of the ordinally related dial shafts, and the assembly is driven by means of an accumulator gear 61, the operation of which will hereafter be explained under the heading "Accumulator Drive Mechanism." The carriage also includes a forward support, or rail, 57, which is held in spaced relationship to the main frame bar 56 by a pair of end plates 58. The carriage rail 57 is supported upon a plurality of rollers 59 carried by the frame portion of the machine, while the main frame 56 is slidably mounted upon a bar, or flange, 66 carried by the rear crossframe member 48, thus enablin the carriage 50 to be shifted transversely across the frame of the machine. The counter dials 54 are mounted on longitudinally extending, ordinally arranged shafts 62, the rear ends of which are journalled in the hollow frame member 56 and the forward ends of which are journalled in the carriage rail 57. The dials 54 and shafts 62 are rotated by means of a counter actuator 160, the specific construction of which will be described hereafter under the heading "Counter Actuator," which is adapted to engage and rotate a drive gear 63, mounted on the co-ordinal shaft 62.

C. *Selection mechanism*

The selection mechanism is mounted in the base portion 50 and includes a conventional keyboard containing ordinally arranged rows of value keys 70 (Fig. 1). The keys 70 are individually mounted on key stems 71 (Fig. 2) slidably supported in the base by suitable means, such as by slots 72 in the key stems embracing cross bars, or tie rods, 73 supported in a conventional keyboard frame, not shown. The key assemblies are biased to a raised, or inoperative, position by a suitable resilient means, not shown. The keys can be latched in a depressed, or operative, position, to control the entry of values into the machine upon cycling thereof, by a suitable ordinal latch slide 74 associated with each order of keys. These latch slides 74 are provided with a series of slots 75 which enclose the key stems 71 of the order. The latch slides 74 are biased to a forward position (to the left in Fig. 2), by means of a spring, not shown, and in that position are effective to latch a depressed key in its depressed, or operative, position. These slides co-operate with cam faces 76 formed on the rear edge of each key stem 71, whereby the depression of the key stem cams the latching slide 74 to the rear. When a key stem is depressed to its operative position, a notch 77 formed in the rear edge of the key stem above the cam face 76, lies opposite the ordinal latching slide 74, whereupon the latter is snapped into the notch by the spring means to hold the key stem latched in the operative position. A key so latched in its operative position is released by the depression of another key in the same order, or by operation of the ordinal clear key 80 (Fig. 1), the stem of which is provided with a cam edge 75, but contains no notch 86, or all of the latching slides can be moved rearwardly to unlatch all operative keys of the keyboard by depression of a keyboard clear key 81.

Each of the key stems 71 is provided with a pin 78, adjacent its lower end. These pins are adapted to engage the associated differentially-angled cam face 85, of a selection, or V-notch, bar 86. Each of the selection bars 86 is mounted for free longitudinal movement, as by pivotally mounting on a pair of parallel arms 87 (only one of which is shown in Fig. 2).

It can be mentioned that in the machine shown herein, and described in the patents above-mentioned, there are two such selection bars 86 for each order of the keyboard, one bar serving the "1" to "5" keys and the other the "6" to "9" keys of that order. It will be understood, therefore, that the depression of any value key 70 will cause the pin 78 thereof, to engage the associated cam face 85 of the related selection bar, thereby translating the bar forwardly a differential amount depending upon the key depressed.

The rear end of each selection bar 86 is provided with a perpendicularly extending yoke 88 which engages an annular slot 89 formed in the hub of an associated selection gear 90. The two selection gears 90 for each order of the keyboard are slidably mounted on an ordinally arranged square shaft 91; all of the shafts being journalled in the crossbars 46, 47 and 48, as shown in Fig. 2. It is believed obvious that the depression of any of the value keys 70 will be operative to differentially position one or the other of the selection gears 90 on the shaft 91.

D. *Accumulator drive*

The selection gears 90, and consequently the square shafts 91 on which they are mounted, are given differential increments of rotation, determined by the longitudinal position of one or the other of the selection gears on the shaft, by means of a conventional Thomas-type actuator 100. The actuator drums 100 are fixedly mounted on actuator shafts 101 journalled in crossbar 46 and a bracket 49 affixed to cross-member 47. The actuator shafts are driven in unison from a transverse drive shaft 102 rotatably mounted in the machine, the various actuator shafts 101 being driven by ordinally arranged pairs of miter gears 103 and 104 as shown.

The actuator drums 100 are provided with two sets of stepped, or mutilated, teeth, one set serving the "1" to "5" selection gear and the other associated with the "6" to "9" gear. The first set of teeth, as shown in Fig. 2, has five teeth of differential length, while the second group (shown on the right in this figure) has six teeth of equal length and three additional teeth of differentially progressive shorter length. Obviously the differential translation of one or the other of the selection gears along its square selection shaft 91 (which results from the operation of a pin 78 upon its associated V-notch cam 85), will place the gear in the plane of a number of teeth on the actuator drum corresponding to the value of the key 70 depressed.

The rear end of the shaft square, or selection, shaft 91, carries a spool, or sleeve 110, slidably but nonrotatably mounted thereon, as seen on the right end of the shaft in Fig. 2. The spool 110 is provided with a plus, or additive, gear 111, and a minus, or subtractive, gear 112, each of which is adapted to become engaged with the accumulator drive gear 61 aligned therewith. Normally the spools 110 are held in the neutral, or disengaged, position shown in Fig. 2 by a centralizer, not shown, in which event neither set of gears engages the accumulator drive gears 61. In this position of the gears, the carriage can be shifted freely from one ordinal position to another without interference with the accumulator drive mechanism. However, the spools 110 can be shifted forwardly or rearwardly by means of a computation control gate 113, and, when so shifted, one or the other sets of the plus or minus gears 111 or 112, respectively, will engage the accumulator drive gear 61. Such engagement takes place before the differential rotation of the selection shafts 91, whereby the differential rotation of the shafts enters the selected value additively or subtractively into the accumulator dials 51.

The gate 113, just mentioned, extends transversely of the machine, and is mounted upon a pair of arms 114, which are rigidly secured to a transverse shaft 115. The shaft 115 can be rocked by various means, such as the add bar 116 (Fig. 1) or the minus key 117, both of which are operative upon digitation control link 118 (Fig. 3) to move it rearwardly or forwardly (to the right or left in Fig. 3) as the case may be. The rear end of this link 118, is pivotally mounted on the arm 119 which is rigidly secured to the digitation control shaft 115. The link 118, arm 119, and shaft 115 are so connected that the operation of the link 118 will set the shaft 115 and consequently the gate 113 to the proper operative position; and conversely the rocking of the gate 113 and shaft 115 by other means, such as the multiplication control hereinafter described, results in translation of the link forwardly or rearwardly as the case may be. This latter movement is important in the present invention as the movement of the link 118 controls the operation of the counter actuator 160, as will hereinafter be described under the heading "Counter Control." It is believed obvious that the rotation of the drive shaft 102 and actuators 100 and the consequent differential rotation of the selection gears 90 and the square shafts 91 on which they are mounted, will drive the accumulator shafts 60 and dials 51 incremental amounts in the selected direction for addition or subtraction.

The accumulator register, comprising the dials 51, is provided with a suitable tens-transfer mechanism by means of which the necessary tens-transfers between the various orders of the register can be effected. In view of the fact that this tens-transfer mechanism is not related to the operation of the present invention, it will not be described, for any tens-transfer mechanism would be suitable for the purpose.

E. *Drive clutch*

Preferably, the drive shaft 102 is driven by a motor, not shown, through a conventional unidirectional clutch. The driving mechanism includes the motor rotor, or shaft, 125 (see Fig. 4) upon which is mounted a pinion 126. The pinion meshes with an idler gear 127 rotatably mounted on a stub shaft 128; the idler also meshing with a larger clutch gear 129, which is rotatably mounted on the drive shaft 102. The clutch gear 129 carries an integral ratchet, not shown, and constitutes the driving side of the clutch.

The driven side of the clutch comprises a plate 130, keyed on, or otherwise rigidly secured to, the power shaft 102. The plate 130 carries a clutch dog 131 pivotally mounted thereon, and adapted to mesh with the ratchet, not shown, on the driving gear 129. The clutch dog is resiliently biased into such engagement with its cooperating ratchet by a suitable spring, but is normally held out of engagement by a clutch control lever 132, pivotally mounted on the right frame plate 42 by any suitable means, such as stud 133. The clutch control lever 132 pivotally supports the rear end of a clutch control link 134, the forward end of which is pivotally mounted on a two-armed lever 135. The two-armed lever 135 is likewise pivotally mounted on the frame plate 42 by any suitable means, such as stud 136. The lower end of the control lever 135 carries a long pin 137 extending through an aperture in the frame plate 42, which pin pivotally supports the forward end of a switch control link 138. The forward movement of the link 138 (to the right in Fig. 4) closes a motor control switch, not shown, to energize the motor, likewise not shown, whereupon the motor is operated to drive pinion 141, idler 127 and clutch gear 129. Simultaneously with the operation of the switch control link 138, the clutch control lever 132 will be rocked (counter-clockwise in Fig. 4) to release the clutch dog 131 and thereby enable it to engage the ratchet and thereby rotate the drive shaft 102.

The switch link 138 and the clutch control lever 132 can be operated by various means, such as an operating link 139 which is moved forwardly by operation of either of the plus or minus keys 116 or 117, by means not here pertinent. In the present invention, the switch link 138 and clutch lever 132 are operated through the medium of the rocking of a transverse shaft 150. Adjacent the right frame plate 42, this shaft carries a lever 151 rigidly mounted thereon. The upper end of the vertical arm of the lever 151 is provided with a pin 152 riveted thereon, or otherwise rigidly secured thereto. This pin is adapted to engage the lower end of a rocker 153 pivotally mounted on a transverse shaft 154. The rear end of the rocker 153 is formed as a hook 155, which lies immediately behind the pin 137 connecting the switch control link 138 to the two-armed lever 135. Thus the rocking of the shaft 150 (counter-clockwise in Fig. 4), through the medium of the pin 152 operating upon the forward end of rocker 153, causes the latter to rock (clockwise in this figure). The movement of rocker 153 causes the hook 155 integral therewith to engage the pin 137; thereby pulling the switch control link forwardly to close the switch, and rocking the lever 135 and consequently the clutch control lever 132 (counter-clockwise in this figure) to cause engagement of the clutch.

F. Revolutions counter actuator

It has already been mentioned that the counter, or quotient, register, comprises a plurality of dials 54 rigidly mounted on longitudinally extending and ordinally arranged shafts 62. Each of the dials 54 bears the numerals "0" to "9," inclusive, which are viewable through the window 55. The shafts and consequently the dials, are given single increments of motion by a gear 63 mounted on each shaft 62, the gear aligned with the units order of the keyboard being given single increments of motion by a counter actuator 160, and the gears of the higher orders receiving a single increment when a tens-transfer is necessary. It can be noted at this point that when the counter is operating additively, the dials 54 are rotated in a clockwise direction (when viewed from the front); and in subtractive operation are rotated in a counter-clockwise direction. The mechanism of the counter actuator 160 will now be described.

The counter actuator, generally designated at 160, includes a shaft 161 having a compound motion of two major components: one an axial, or longitudinal, reciprocation; and the other an angular oscillation, or rocking. That is, the shaft 161, which is slidingly and rotatably mounted in the frame plates 42 and 43 (Fig. 5), is given a compound motion which includes the rocking of the shaft and a lengthwise shifting within the frame of the machine. In additive operation, the shaft 161 is first rocked (clockwise when viewed from the right as in Fig. 2 or Fig. 6), to cause the actuator 160 to engage the gear 63; then shifted to the left to rotate the gear 63; then rocked backwardly to its original angular position to disengage the actuator from the gear; and then returned to the right to its starting position. In subtractive operation of the counter, the shaft 161 is first shifted to the left; then rocked (clockwise in the figures mentioned), to engage the actuator with the gear 63; then shifted to the right to rotate the gear 63 in a negative direction; and finally rocked to its original angular position to disengage the actuator from the counter gears.

A pair of collars 162 are fixedly mounted on the shaft 161 between the frame plates, as shown in Fig. 5, each of which is extended rearwardly to support a rod 163. A plurality of actuator spools 164 are rotatably mounted on the shaft 161, between the collars 162. These spools, with the exception of the right-hand, or lowest order, spool are of identical size and shape, having a length corresponding to the ordinal spacing of the counter dial shafts 62. Each spool, with the exception of the lowest order spool, is provided with a sensing finger 165 on its right-hand end and an actuating finger 166 on its left-hand end, as shown in Figs. 6 and 7—the right-hand sensing finger 166 lying in the vertical plane of the dial shaft 62 of the adjacent lower order and the actuating finger 166 lying in the vertical plane of the shaft of the associated order. The sensing finger 165 on each spool is bent, as shown in Figs. 6 and 7, to lie in the plane of the actuating finger 166 of the adjacent lower order, and is provided with a stop shoulder, or abutment, 167 adapted to engage that actuating finger. Thus, the forward rocking (counter-clockwise in Figs. 2, 6 and 7) of the spool of any order rocks all spools of the higher orders in the same direction. Each spool, and consequently the fingers integral therewith, is biased in a rearward direction (clockwise in the figures just mentioned), by means of a spring 168 (Fig. 2) tensioned between the tie rod 163 and a seat formed in the actuating finger 166.

The units order actuator spool 169 is modified slightly from the other actuating spools 164 to the left thereof. This spool carries an actuating arm 166 identical with those of the other spools 164, and this arm is connected to the tie rod 163 by the spring 168 as was true of the others. Normally this spool is considerably shorter than the others, and at its right end carries a counter block-out lever 170 (see Fig. 5). In the normal position of the parts, the counter block-out lever 170 abuts the tie rod 163, whereby the return rocking of the actuator shaft 161 (counter-clockwise in Figs. 2, 6 and 7) positively rocks the collar 169 and all of the collars 164 back to their normal, or disengaged, position. This arm, therefore, prevents over-rotation of the various collars, holding all of them in their disengaged position until the shaft 161 is rocked (clockwise in the figures mentioned) to the engaging position, and positively returns all of the collars to their normal disengaged position at the end of the counting operation.

It will be understood by those familiar with the art, that the counter is adapted to enter a single count into the counter dials 54 with each cycle of operation in order to give a true count of the cycles of operation. Thus, normally, unless the counter is disabled completely by means not here pertinent, the units order of the counter actuator (which is aligned with the units order of the keyboard 70), will be operative to give the aligned counter dial 54 a single increment of motion in one direction or the other with each digitating cycle of the machine. That is, the rocking of the shaft 161 normally operates the lowest order spool 169, but not those of the higher orders, unless a tens-transfer is necessary from a lower to a higher order. This blocking operation of the spools 164, and the operation of a tens-transfer when that is necessary, are under the control of a notched disk 64 rigidly secured to each counter shaft 62. This disk contains a single notch 65, which lies in the position shown in Fig. 6 when the associated dial stands at "0." The disk 64 is so located on the shaft 62 that it lies behind the associated sensing finger 165 (which controls the entry of values into the next higher order dial 54), and in front of the actuating finger 166 of its own order (see Figs. 2 and 6). Thus, when the counter is operative, the rocking of the shaft 161 and with it the collars 162 and tie rod 163, biases the counting finger 166 of the units order into engagement with the aligned gear 63. Thereafter, the translation of the shaft 161 will move the gear one tooth space to add or subtract a value of "1" in the aligned dial 54. The rocking of the shaft 161 and tie rod 163 resiliently biases all of the spools 164 in the same direction. However, unless the dial aligned with the lowest order actuator stands at "9" in addition, or "0" in subtraction, the sensing finger 165 of the tens-order spool 164, at the start of such rocking, will engage the face of disk 64, thereby preventing further rocking of the spool as the spring 168 will yield. The blocking of rotation of the tens-order spool 164 beyond the point of engagement of the sensing finger 165 with the disk 64 prevents the actuating finger on the left end of the spool from engaging its aligned gear 63, so that the actuating finger 166 of that order cannot engage its gear 63, and hence the translation of the shaft 161 will be ineffective in the second order, and all higher orders. On the other hand, if the dial 54 aligned with the units order actuator 169 stands at "9" in addition, or "0" in subtraction, then the notch 65 on the disk 64 will be aligned with the sensing finger 165 of the tens-order spool 164. In that event, the spool can rock to the full extent of its movement, for the sensing finger 165 will pass through the notch 65, thereby permitting the actuating finger 166 of that spool to engage its aligned gear 63. In that event, the translation of the shaft 161 will be effective to enter a single count in both dials. This control of the counter actuator spools extends throughout the counter register and is effective to control a positive transfer through all orders if the dials are positioned therefor. It can be noted at this point that in subtractive operation of the counter, the leftmost, or highest order, spool 164 will rock with the rocking of shaft 161 when all of the dials between it and the units order spool 169 stand at "0."

The means for providing the angular movement, or rocking, of shaft 161 is shown in Fig. 8. The main drive shaft 102 carries a cam 180 rigidly mounted thereon, immediately to the left of the left frame plate 43. A bellcrank cam follower 181 is associated with the cam 180, having a roller 182 engaging the periphery of the cam 180. The cam follower bellcrank is mounted at its elbow on the frame plate by any suitable means, such as on stud 183, and is resiliently biased into engagement with the cam (clockwise in Fig. 8), by means of a relatively strong spring 184 tensioned between a stud on the forward end of the follower and a stud on the frame plate, as shown. The vertical arm of the bellcrank 181 is slotted, as at 185, to embrace a pin 186 carried by an arm 187 rigidly mounted on the left end of the counter shaft 161. Thus, the rotation of the drive shaft 102 and cam 180 rocks the follower bellcrank 181 forwardly (clockwise in Fig. 8) and then rearwardly, and this rocking imparts a reverse angular movement to arm 187 and shaft 161 (first counter-clockwise and then clockwise in Fig. 8, or first clockwise and then counter-clockwise in Figs. 2, 6 and 7).

The means for effecting the axial movement, or longitudinal translation, of the shaft 161 is shown in Figs. 9 and 10. It will be recalled that the longitudinal translation, or axial movement, of the shaft 161 must be timed to follow the rocking movement thereof (derived from the cam 180) in additive operation, and to precede the rocking in subtractive, so that means must be provided to operate the translating means differently in addition and subtraction. This is secured by means of a wobbler cam 195, fixedly mounted on the shaft 102, immediately to the left of the right frame plate 42. This cam is provided with two peripheral slots, as shown in Fig. 10, 196 for additive operation and 197 for subtractive. These peripheral slots are of identical configuration but are angularly offset one from the other, as shown in Fig. 10. The slots, or channels, 196, 197 of the wobbler cam are adapted to be engaged by pins 198 and 199, respectively, which are mounted in the lower arm 200 and upper arm 201, respectively, of a yoke 202 (see Fig. 9). This yoke is rotatably and slidably mounted on a shaft 203, supported in a pair of brackets 204 mounted on the frame plate 42. The upper arm 201 of the yoke is extended rearwardly, as shown in Figs. 9 and 10. The rear end of this extended arm carries a long, upstanding pin 205 which lies adjacent the shaft 161 and is embraced within the flanges of a flanged collar 171 mounted on the right end of the shaft 161 (see Fig. 5). Thus, the rocking motion of the wobbler cam follower yoke 202 is imparted to the shaft 161, causing axial, or longitudinal, movement thereof. Whether the first longitudinal movement occurs before or after the initial rocking of the shaft depends upon whether pin 198 or 199 engages its associated slot 196 or 197, respectively; and this, in turn, depends upon the vertical position of the yoke 202 on its shaft 203.

The means for positioning the yoke 202 in either its upper or lower position is shown in Figs. 3 and 9. It is seen in Fig. 9 that the yoke is provided with an annular slot 210 which embraces a pin 211 carried by the forward end of an arm 212. The arm 212 is rigidly mounted on a stub shaft 213 which extends through the frame plate 42 (see Fig. 3). Whenever the shaft 213 is rocked counter-clockwise in Fig. 9, the yoke is lifted from the neutral position shown, whereupon the pin 198 engages the slot 196. Then, upon cycling of the machine, the yoke is rocked for positive operation of the counter, in which the rocking of yoke 202 and consequent reciprocation of shaft 161 is delayed to follow the first rocking movement of the counter shaft 161. If the shaft 213 is rocked clockwise in this figure, then pin 199 engages slot 197, and the yoke 202 is rocked for subtractive operation of the counter. In this operation, the yoke is rocked in its first step, prior to the rocking of counter shaft 161.

The means for rocking the shaft 213 is shown particularly in Fig. 3. A control plate 214 is rigidly mounted on the right end of shaft 213—the plate having an upper notch 215 and a lower notch 216, as shown. An operating Y-link 220 is associated with the plate 214, the link being pivotally mounted at its rear end on the digitation control slide 118. The link 220 is branched at its forward end, the upper arm carrying a pin 222 adapted to engage the notch 215 and the lower arm carrying a pin 223 adapted to engage the notch 216. Normally the link 220 is resiliently biased to its lower position by a spring 224 tensioned between the link and a stud on the frame plate, not shown. In this position the pin 222 engages notch 215 and the counter is conditioned for operation in the same sign character as that of the accumulator actuating spool 110. That is, if values are being entered additively into the accumulator dials 51, then the cyclic count of machine operations will be entered additively into the counter dials 54, while if the accumulator is acting subtractively, so will the counter. It will be recalled that in additive operations, the shaft 115, and consequently the digitation control spool 110 (Fig. 2), are rocked in a clockwise direction from the position shown in Figs. 2 and 3. Such rocking causes the link 220 to pull the plate 214 and shaft 213 (clockwise in Fig. 3 and counter-clockwise in Fig. 9) to set the yoke 202 for additive operation. Conversely, if the machine is set for subtractive operation, the shaft 115 and digitation control spool 110 are rocked counter-clockwise from the position shown in Fig. 3, thereby rocking the plate 214 and shaft 215 in a counter-clockwise direction in this figure (clockwise in Fig. 9) to set the yoke 202 for subtractive operation.

The construction just shown and described enables the operator to set the counter for registration in a sign character opposite to that of the accumulator dials 51. This setting for unlike operation is normally advisable in division, which is a series of subtractive operations during which the divisor in the keyboard is continuously subtracted from the dividend in the accumulator dials 51. Normally, in division, a positive count in the counter dials 54 is desired in order to give a true quotient reading. This reverse operation of the counter, with respect to the accumulator, is readily secured by lifting the link 220 so that the pin 223 on the lower arm engages the lower notch 216. In that event, the rearward movement of the digitation control link 118 (which corresponds to the clockwise rocking of shaft 115) rocks the plate 214 and shaft 213 (counter-clockwise in Fig. 3 and clockwise in Fig. 9) to set the yoke 202 for subtractive operation and the forward movement of link 118 sets the yoke for additive operation.

G. *Register clearing mechanisms*

A conventional means for clearing the accumulator register dials 51 or the counter dials 54 is illustrated in Fig. 2. In the machine of the patents above-mentioned, such mechanisms comprise a mutilated clearing gear 230 rigidly mounted on each of the accumulator shafts 60 and a similar mutilated gear 232 rigidly mounted on each of the counter shafts 62. Preferably, these mutilated gears are staggered on their respective shafts, as shown, in order to permit closer spacing of the ordinal shafts 60 and 62. Associated with the clearing, or mutilated, gears 230 and 232 are clearing racks 231 and 233, respectively. The respective dials are returned to their "0," or clear, position by longitudinal translation of the racks 231 and 232, respectively, as fully shown and described in the patent to Friden, No. 2,229,889, already mentioned. These racks can be actuated manually by means of knobs 234 and 235, respectively (shown in Fig. 1).

The clearing racks can also be operated by power, as through the depression of the carriage clear key 240, or automatically in certain operations by a mechanism which is shown particularly in Figs. 11 and 12. This mechanism comprises a power-operated clearing bar 241, slidably mounted on the carriage frame bar 56 (see particularly Fig. 12). Preferably the power bar 241 is mounted by a conventional pin-and-slot mounting, which includes slots 242 in the bar registering with pins 243 mounted in the carriage frame bar 56. It is conventional to bias the bar to its left-hand, or inoperative, position (to the right in Fig. 12) by a suitable tension spring 244, as shown. The right end of the power bar 241 (as shown in Fig. 1) carries an integral bracket 245 upon which are riveted, or otherwise rigidly secured, pins 246 and 247. Interponent arms 248 and 249 rigidly affixed to the knobs 234 and 235, respectively, enable the operator to selectively connect the clearing racks 231 and 233, respectively, to the bracket 245. When so connected, the rightward motion of the bar 241 (to the left in Fig. 12) through the connecting arms 248, 249, respectively, push the knobs 234 and 235, respectively, and their related racks to the right for the clearing of the registers. However, it should be noted that either register can be disconnected from the power bar 241 by rotating the knob 234 or 235 counter-clockwise to remove the end of the respective connecting link from the rivet 246 or 247. It can be noted that in connection with the present invention it will be necessary in all multiplying operations to disable the clearing of the counter register dials 54, so that it can be assumed that in all such operations the knob 235 will be rocked to disengage the counter clearing rack 233 from the power bar 241. This is necessary because in the present invention I utilize the factor standing in the counter register (which normally would be a quotient secured in a previous division operation) as a multiplier, and therefore will not clear the value from the counter dials 54. It is obvious that this could be done automatically from the depression of the multiplier control keys of my invention, but for purposes of illustration I show the simpler method of disconnecting the counter clearing rack 233 from the power-operated bar 241 through the manual operation of knob 235.

The power bar 241 is operated, i. e., translated to the right against the tension of spring 244 by means of a power-operated arm 250 (Fig. 12). This arm is pivotally supported on a stub shaft 251 which is mounted between the rear crossframe member 48 and a bracket 252. This arm is normally biased to the left by any suitable means, such as a tension spring 253 tensioned between a spring seat in the arm and a stud on the bracket 252, as shown, and is adapted to engage a roller 254 at the lower end of a bracket 255 rigidly secured to the power bar 241.

The power arm 250 is operated against the tension of its spring 253 by means of a cam 256 which is rotatably mounted on the leftmost actuator shaft 101, which is extended for that purpose—a roller 257 mounted on the arm 250 engaging the periphery of the cam. The cam 256, just mentioned, is rotatably mounted on the extended actuator shaft 101 and can readily be clutched thereto so as to rotate therewith by means of the clutch shown in Fig. 11. A clutch member 260 is slidably but nonrotatably mounted on the actuator shaft 101, intermediate the crossframe members 47 and 48. This clutch member is shiftable rearwardly on the shaft by means of a yoke 261 which engages an annular groove 262 in the clutch member. The yoke 261 is slidably mounted on a clutch control rod 263, and is resiliently biased to the rear end of that bar by a compression spring 267 compressed between the yoke and a collar 268 on the rod. Normally the rearward translation of the rod 263 will push the yoke 261 rearwardly, thereby moving the clutch member 260 to clutch-engaging position. However, the yoke can be held in its forward position against rearward translation of the bar 263, by an interlock which will shortly be described.

The bar 263 is normally biased toward the front of the machine by a spring 269 (see also Fig. 13) seated against the front crossframe member 46 and held on the bar 263 by a collar, not identified. The clutch control rod 263 can be moved to its operative position, rearwardly from the position shown in Fig. 11, by means of a pusher link 270. The front end of the pusher link 270 is mounted on an arm 271, which arm is rigidly secured to a transverse shaft 154 that can be rotated by means which will hereafter be described. The link is resiliently urged into engagement with the clutch rod 263 by a spring 272 tensioned between arm 271 and link 270, as shown.

A clutch jaw 264 (Fig. 11) mounted on the rear face of the clutch member 260 is adapted to engage a complementary clutch jaw 265 mounted on the forward end of a sleeve 266 integral with the clear cam 256. This sleeve is journalled in the rear cross-member 48 and the bracket 252 previously mentioned. Thus, when the clutch member 260 is moved rearwardly to its operative, or clutch-engaging position, the rotation of shaft 101 on which it is mounted is effective to rotate the clear cam 256, thereupon rocking the power arm 250. If the carriage 50 is in the extreme left-hand position (to the right in Fig. 12), the power arm 250 can engage roller 254, whereby the oscillation of the power arm 250 will reciprocate the bracket 255 and power bar 241, first to the right and thereafter to the left to effect a clearing operation of the registers.

I prefer to utilize an interlock, shown in Fig. 12, to prevent engagement of the clutch in any ordinal position of the carriage other than the extreme left-hand position just mentioned. Such an interlock is not necessary, but I believe it to be desirable to prevent operation of the clear clutch until the carriage has reached the extreme left-hand position. A simple means is shown and comprises a bellcrank 275, which is pivoted at its elbow on a screw 276 threaded into the bracket 252. The lower arm of the bellcrank is provided with a forwardly extending ear 277 which normally engages a projection 278 integral with the clutch control yoke 261, just mentioned—the bellcrank 275 being biased to a blocking position (the counter-clockwise position shown in Fig. 12) by means of a spring 279. The upper arm of the bellcrank is engaged by the roller 254 as the carriage shifts into its extreme left-hand position thereby rocking the bellcrank 275 (clockwise when viewed from the rear, as in Fig. 12) to disengage the ear 277 from the projection 278. It will be understood that normally the ear 277 will be in blocking position upon the rearward movement of clutch control rod 263 thereby blocking movement of the yoke 261 and clutch member 260 until the extreme carriage position has been reached. When that extreme position is reached, the bellcrank 275 is rocked to unblock the ear 278, thereby permitting the spring 267 to push the yoke 261 to the rear to the operative position of the clutch. In the following machine cycle the rotation of the actuator shaft 101 will rotate the cam 256 through a full revolution to effect a clearing operation.

It can be mentioned at this point that in this clearing cycle of operation an override mechanism will be operated which disables the clutch by lifting the rear end of the interponent 270. It will be obvious that the rocking of shaft 154 (clockwise when viewed from the right as in Fig. 13), is effective to move the interponent 270 rearwardly, thereby pushing the clutch control rod 263 in the same direction. Such movement of the rod 263 compresses the spring 267, if the yoke 261 is held in its forward position by means of the ear 277 just mentioned, thereby resiliently biasing the yoke 261 to a rearward, or operative, position. As soon as the carriage 50 shifts to the extreme left-hand position, the roller 254 rocks the bellcrank 275, thereby moving the ear 277 away from the yoke 261 and permitting the force of spring 267 to move the clutch member 260 rearwardly into engaging position. In the next cycle, the sleeve 266 and cam 256 are given a full revolution, thereby operating the clearing bar 241 to clear the registers as above described. At the end of the cycle the interponent, or pusher link, 270 will be lifted by a means to be described under the heading "Shift and Clear Programming Mechanism." When this occurs, the spring 269 forces the rod 263 forwardly to its inoperative position. Thereafter the interponent 270 is released, but in that event the shoulder rides upon the upper edge of the rod 263 and is therefore ineffective to operate the clear mechanism until the series of operations involved in the rocking of shaft 154 has been completed.

H. *Carriage shift*

The carriage 50 can be shifted in either direction, either automatically in certain operations or under the control of shift keys 290 and 310 (Fig. 1). Depression of the right shift key 290 rocks a sleeve 291 (see Fig. 11) by means not here pertinent. The sleeve 291 is rotatably mounted on a shaft 311, and at its left end carries an arm 292 rigidly mounted thereon. The arm 292 supports the front end of a pusher link, or interponent, 293, pivotally mounted thereon. A spring 294 biases the interponent 293 downwardly, so that a shoulder, not shown, formed on the rear end thereof, abuts against the forward end of a clutch control rod 295. The clutch control rod is biased to a forward position by a compression spring 296. The rear end of the rod 295 carries a clutch actuator plate 297 which is positionable to control a clutch 298. Preferably, as shown, the control plate 297 and clutch 298 are of the type described in the patent to Matthew, No. 2,679,916 of June 1, 1954. This clutch 298 is mounted on the rear end of the rightmost actuator shaft 101, and is rocked to its operative position by the rearward movement of control bar 295 and clutch control plate 297, and these, in turn, are so translated by the rocking of the sleeve 291 (clockwise when viewed from the right) and the consequent translation of the interponent 293 rearwardly.

When the clutch driver 298 is rocked to its operative position, it engages a driven disk 299 which forms the driven side of the clutch. The disk 299 is mounted on a sleeve 300 journalled in the rear cross-bar 48 and in a bracket 289 affixed to the rear crossframe member. The sleeve 300 carries an integral gear 301 which meshes with a wide idler 302 (Fig. 12), and the wide idler 302, in turn, meshes with a large idler 303. A small idler 304 is secured to the large idler 303, and meshes with a second large gear 305 (see Fig. 11 or 12). The gear 305 is rigidly mounted on a sleeve 306, likewise journalled in the rear crossframe member 48 and the bracket 289. On the rear end of the sleeve 306 is a shift plate 307 carrying a number of drive pins 308 (four such pins in the preferred form of the mechanism of my invention).

Similarly, the depression of the left shift key 310 rocks the shaft 311 (Fig. 11) on which is rigidly mounted an arm 312. The arm 312 supports the forward end of an interponent, or pusher link, 313 pivotally mounted thereon. The rear end of the link 313 is biased downwardly by a spring 314, whereby a shoulder, not shown, engages the forward end of the left shift control rod 315. This control rod is normally biased to a forward, inoperative, position by any suitable means, such as spring 316. A clutch control plate 317 is mounted on the rear end of the control bar 315 and is adapted to position a clutch member 318 in its operative or inoperative position. The clutch driver 318 is adapted to engage a driven plate 319 which is rigidly secured to a sleeve 320 journalled in the crossframe member 48 and the rear bracket 289. The sleeve 320 carries a gear 321, which meshes directly with the gear 303 previously mentioned. Thus the two actuator shafts on which the two clutches 298 and 318 are mounted (which shafts rotate in the same direction), are operable to rotate the gear assembly including the gears 303, 304, and 305 in reverse directions, depending upon which of the clutch control bars 295 or 315 is operated.

It can be mentioned that in its preferred form, the shift drive is similar to that disclosed in the patent to Matthew, No. 2,636,678 of April 28, 1953. It is preferred also, that the gear trains, including the driving gears 301 or 321 and terminating with gear 305, have a gear ratio of 4 to 1, whereby the gear 305 and drive plate 307 are rotated through an angle of 90° for each full-cycle operation of the actuator shafts 101. The latter have a 1 to 1 gear ratio with a drive shaft 102, so that a single cycle of machine operation will cause a rotation of the drive plate 307 equal to 90°. In this construction, the drive plate 307 will carry four drive pins 308, as shown in Fig. 12.

The drive pins 308 on the shift plate 307 are adapted to engage notches 330 formed in the lower edge of a rack 331 mounted on the rear of the carriage frame bar 56, as shown in Figs. 2 and 12. Thus the rotation of the shift plate 307 will be operative to shift the carriage in one direction or the other, depending upon which clutch 318 or 298 has been engaged with its driven member 319 or 299, respectively.

I. *Left shift terminating mechanism*

It is conventional in the machine described in the patents previously mentioned, to provide a means for terminating an automatic shift in either extreme carriage position. The power operated clearing mechanism heretofore described, operates when the carriage is in the extreme left-hand position, and preferably only once, so that it is conventional to terminate the clearing operation at the same time and preferably by the same mechanism. The termination of these shifting and clearing operations, through the disabling of the mechanisms, is required in certain programmed operations, such as multiplication, dividend entry, etc. For example, in a multiplication operation, the carriage is conventionally shifted to the extreme left-hand position, the registers are then cleared and multiplication is begun in the extreme right-hand order. In such a program, it is essential that the clearing mechanism be operated once and once only. It is also necessary, in such a programmed operation, to latch the left shift clutch in its engaging position during the shifting cycles and to disable that mechanism when the extreme carriage position has been reached, for thereafter the carriage is shifted in the opposite direction. Termination of operation of both the left shift clutch and the clear clutch are controlled by the attempted over-shifting of the carriage beyond the terminal position by means which are shown particularly in Figs. 11 and 12.

An override pawl 340 (see Fig. 12) is pivotally mounted adjacent the right end of the rack 330, as upon stud 341. The left end 342 (on the right in Fig. 12) of the pawl 340 is so located as to form the right side of the terminal slot 330, as shown—the carriage being illustrated in a position one order removed from the terminal position. The lower edge of the pawl 340, adjacent the left end 342 thereof, is formed with a cam face 343 adapted to be engaged by a drive pin 308 when the shift mechanism is operated to attempt a left-hand shift of the carriage (to the right in Fig. 12) beyond the terminal position, thereby rocking the pawl 340 against the tension of the spring 344 which biases the pawl to its normal position (clockwise in this figure). The right end of the pawl is provided with a nose 345, which, when the carriage is in the extreme left-hand position, overlies an ear 350 formed on the upper end of the vertical extension of an L-shaped arm 351. The arm 351 is pivotally mounted on the rear crossbar 48, substantially in the middle thereof, as upon screw 352. The rocking of the pawl 340 during the attempted overdrive of the carriage shifting mechanism therefore rocks the arm 351 about its pivot 352 (counter-clockwise in Fig. 12). The vertical extension of the L-shaped lever 351 overlies the horizontal arm of bellcrank 353 which is pivoted on any suitable means, such as upon the computation control shaft 115. The depending arm of the bellcrank 353 pivotally supports the rear end of a forwardly extending link 354 (see Fig. 11), the forward end of which is pivotally mounted on an upstanding arm 355 of a bail 356 rotatably mounted on the shaft 154, previously mentioned. The bail 356 carries a rearwardly extending arm 357 which is formed to pass beneath the shaft 154 and then upwardly, as shown. This arm 357 is provided at its rear end with an angularly extending projection, or ear, 358 which underlies the interponent 313. Thus, the rocking of the bail 356 from the operation of the override pawl 340 is effective to lift the pusher link, or interponent, 313 against the tension of its spring 314, so that it becomes disengaged from the forward end of the clutch control rod 315. Thereupon, the spring 316, which biases clutch control rod 315 forwardly, is enabled to translate the rod forwardly to its inoperative position.

The bail 356 carries a leftwardly extending projection 359, or extension, which lies behind the shaft 154, as shown in Fig. 11. This projection extends to the left and underlies a bellcrank member 360 (see Fig. 13) pivotally mounted at its elbow upon the shaft 154. This bellcrank extends rearwardly, and at its rear end is provided with a laterally extending ear 361 which underlies the clear clutch rod interponent 270. This interponent, as previously mentioned, controls the positioning of the clear control rod 263. Therefore, the rocking of the bail 256 simultaneously disables the left shift clutch 318 and the clear clutch 260 whenever the shift of the carriage 50 is attempted beyond the extreme left-hand position.

It can be mentioned at this point that the extension 359 of the bail 356 also underlies a pusher link, or interponent, 381 which controls the operation of a power-operated programming mechanism described in the next section. It can also be mentioned at this point that the operation of the bail 356 and the bellcrank 360 is effective to initiate the operation of the conventional multiplier mechanism (if that mechanism is conditioned for operation by depression of a multiplier key), as will be described hereafter under the heading of "Multiplication Mechanism." It should further be noted that the operation of the bellcrank 360 will be effective to initiate operation of the auxiliary multiplication mechanism of my present invention if the machine has been conditioned for such operation through the depression of one of the counter multiply keys 500 or 800 of the present invention. One or the other of the multiplying mechanisms will be disabled by an interlock controlled by the depression of the various control keys, as will hereinafter be explained.

It should also be noted that although the rocking of the bail 356 is momentary, and the pusher links, or interponents, controlled thereby, will be permitted to return toward their normal positions immediately, such return will not re-engage the clutches. The respective interponents 313 and 270 will have been lifted above the respective control rods 315 and 263, permitting the rods to be biased forwardly by their respective springs. When the bail returns to its normal position, the interponents 313 and 270 will therefore ride upon the top of the control rods and will not engage the ends thereof. Thus, the left shift clutch and the clear clutch cannot become re-engaged until after the operation is terminated and the respective controls (which are latched in their operative position) are returned to their normal inoperative positions.

It can be noted in connection with Fig. 12, that the machine shown for purposes of exemplification, has a similar over-ride pawl mounted on the left end of the carriage. However, the operation of this pawl has no connection with the multiplication mechanism herein described, so that a description of its construction and operation can be omitted.

J. Shift and clear programming mechanism

It is convenient, in the machine shown herein for purposes of exemplification, in initiating those operations which include an initial left shift of the carriage followed by a clearing of one or the other of the registers in the extreme left-hand position thereof, to utilize a single power-operated mechanism for controlling the programmed operations. Preferably, this mechanism is of the type shown and described in the patent to Machado No. 2,650,761, of September 1, 1953, the two side views of which are shown in Figs. 14 and 15 and the operation of which is controlled by the rocking of the shaft 150 above-mentioned. It will be recalled that the rocking of the shaft 150, which is journalled in the right frame plate 42 and the intermediate, or auxiliary, bracket 44 (Fig. 11) is also effective to initiate the engagement of the main clutch and the operation of the motor by means of the mechanism shown in Fig. 4. Thus the rocking of the shaft 150 not only conditions the programming mechanism now to be described, but also initiates machine operation.

The shaft 150, at a point intermediate the frame plate 42 and bracket auxiliary plate 44 (Fig. 11), carries a bellcrank member 370 rigidly secured thereto (see also Figs. 14 and 15). The upper arm of the bellcrank is provided with a pin 371 embraced within a slot 372 formed in the front end of a rearwardly extending link 373. A spring 369 holds the arm 370 and link 373 in their retracted position shown, whereby the link 373 is resiliently biased rearwardly whenever the arm 370 is rocked (clockwise in Fig. 15, counterclockwise in Fig. 14). The rear end of the link 373 is pivotally connected to one arm 374 of an eccentrically mounted hook member which is mounted on an eccentric, not shown, carried by a shaft 375. This shaft, incidentally, is connected to the main drive shaft 102 by constantly meshing gearing, not shown, and is therefore driven in synchronism with the main drive shaft 102. A hooked arm 376 is formed integral with the arm 374 to form the bellcrank hook member which is constantly reciprocated by its eccentric mounting whenever the machine is in operation. Normally the hook 376 reciprocates in a path in which it is ineffective, so that such constant travel is mere idle movement. However, when the shaft 150 is rocked (clockwise in Fig. 15 or counter-clockwise in Fig. 14), and the hook arm 376 is consequently rocked on its eccentric mounting, the hook portion will engage a pin 377 on the rear end of a bellcrank 378 rigidly secured to the transverse shaft 154. Thus, the first rotation of the shaft 375, when the reciprocating hook member 376 has been rocked to its operative position, is effective, through the drive of the machine, to rock the bellcrank 378 and shaft 154 (clockwise in Fig. 15 and counter-clockwise in Fig. 14).

The arm 378 is latched in the rocked position by a suitable latch 379, which is released only by the return of the shaft 150 and its bellcrank 370 to their original positions shown in Figs. 14 and 15. Thus the control shaft 154 is maintained in its operative position until the bellcrank 370 is returned to its inoperative position, which occurs only upon termination of a multiplication operation by the automatic release of the multiplier control key.

It will be recalled that the shaft 154 carries the arm 271, the rocking of which, through the medium of interponent 270, moves the clear clutch control rod 263 rearwardly to its operative position. The operation of the clutch 260 is delayed until the shifting of the carriage releases latch 275. However, the latching of shaft 154 in its operative position is effective, among other things, to condition the clear clutch for operation in the cycle in which the carriage lies in the extreme left-hand position.

The shaft 154 also carries an arm 380 rigidly mounted thereon. The forward end of an interponent 381 is pivotally mounted on the arm 380, the rear end riding upon the shaft 375, as shown in Fig. 14. The rear end of the interponent 381 is provided with a shoulder 382 which is adapted to engage a pin 383 mounted in the lower end of an arm 384. This arm is rigidly affixed to a sleeve 385 (see particularly Fig. 11) which is rotatably mounted on the left shift control shaft 311. The right end of the sleeve 385 carries a second arm 386, on the free end of which a long pin 387 is mounted. This pin 387 engages the forward end of the left shift control rod 315, so that the rocking of sleeve 385, initiated by power rocking of shaft 154, is effective to move the left shift control rod 315 to its operative position.

The mechanism just described will be effective, upon initiation of a multiplication operation by the mechanism of my present invention, to shift the carriage 50 to its extreme left-hand position and in that position to clear the accumulator register dials 51. The attempted overshifting of the carriage, during the clearing cycle, will be effective to operate the override pawl, which, in turn, rocks the bail 356. The rocking of this bail, as previously described, disables the clear clutch by lifting the interponent 270 to an inoperative position, and simultaneously disables the left shift clutch by lifting the interponent 381 to its inoperative position—the interponent overlying the extension 359 of the bail, as shown in Figs. 14 and 15. The rocking of the bail 356 will be effective, also, to initiate the actual multiplication operation.

K. Multiplication mechanism

The instant invention is disclosed, as embodied in a machine of the type described in the patents to Friden, Nos. 2,371,752 and 2,399,917, previously mentioned. The machines manufactured in accordance with the teachings of these patents include a multiplier mechanism in which values are inserted by depression of multiplier value keys 400 (Fig. 1). The selection mechanism operated by these value keys 400 is not pertinent to the present invention, nor is the actuating mechanism by means of which a multiplier value so set into them is utilized to multiply a factor set in the keyboard 70. Therefore, the conventional multiplier mechanism will not be described herein. However, it should be noted that the operation of the multiplier mechanism, including the shift of the carriage and clearing of the registers, as above mentioned, is initiated by multiplier control keys 401, 402, and 403, which respectively initiate performance of the various types of multiplication for which the machine is adapted.

This mechanism is mentioned at this point as it is believed preferable to disclose the present invention in connection with a machine including the multiplier mechanism of the patents mentioned. When the mechanism of the present invention is so included in such a machine, it is desirable to provide an interlock between the present multiplying mechanism and that previously known. This is important as it is most efficient, in connection with the present invention, to utilize the shifting and clearing controls, as well as the actual multiplier initiating means, of the conventional machine.

The depression of the multiplier control keys 401, 402 or 403 is operative in the conventional machine to rock a U-shaped lever 404 (see Fig. 16), through mechanism not here pertinent. This lever is mounted on a shaft 405, and is provided with a pin 406 which overlies the forwardly extending arm of a bellcrank latch 407. The latch 407 is pivotally mounted on a control, or auxiliary, plate 45 by any suitable means, such as stud 408. The upwardly extending arm of the latch lever 407 underlies an ear 409 formed on the forward end of a spring-powered lever 410, the rocking of which (clockwise in this figure) is effective to initiate operation of the conventional multiplying mechanism at the termination of the shifting and clearing operations previously described. It can be noted here that if the lever 404 is locked against rotation, it will be impossible for an operator to depress the control keys 401 and 402 or 403.

It was previously mentioned that the rocking of the bail 356 (Fig. 11) was effective to initiate the actual multiplying operation. This is secured from the rocking of the bellcrank 360 (see Fig. 13), which rides upon the leftward extension 359 of the bail—the bellcrank 360 being rocked in a counter-clockwise direction in this figure upon operation of the override pawl. The lower arm of the bellcrank 360 is provided with a pin 415 which is engaged within a notch 416 formed in the lower edge of a rearwardly extending link 417. The forward end of the link 417 is pivotally mounted on an arm 418 rigidly mounted on a shaft 419. This shaft, incidentally, extends from the auxiliary plate 44, as shown in Fig. 13, leftward through the left-hand control plate 45, as shown in Fig. 16. The link 417 is biased into engagement with the pin 415 by a suitable spring 420 tensioned between a projection on the link 417 and the bellcrank 360.

The left end of the shaft 419, as shown in Fig. 16, carries a latch member 421 rigidly secured thereto. This latch member is provided with an upwardly opening shoulder 422 which engages a pin 411 on the power arm 410, the latch thereby constituting a second latch against the operation of this arm. In the conventional multiplying mechanism, the latch 407 is released by the depression of the multiplier keys to initiate the shifting and clearing operations. Then, when the override pawl is operated, the latch 421 is operated to release arm 410 which initiates the actual multiplication operation. However, both latches are necessary so that multiplication will not be initiated upon any other operation of the override pawl and the mechanism controlled thereby.

The rocking of the override pawl, and of the bail 356 controlled thereby, is effective to rock the bellcrank 360 (counter-clockwise in Fig. 13). Such rocking of the bellcrank pulls the link 417 rearwardly, thereby rocking shaft 419 (clockwise in Fig. 13 and counter-clockwise in Fig. 16). The rocking of the shaft 419 moves the latch 421 (counter-clockwise in Fig. 16), away from the pin 411, thereby permitting the multiplier control arm 410 to drop.

In connection with the present invention, I prefer, upon depression of the control keys of the present invention 500 or 800, to initiate an automatic program which includes the shifting of the register carriage 50 to the extreme left-hand ordinal position, then effecting a clearing of the accumulator register dials 51, and thereafter initiating the multiplication operation. It is obvious that the initial program of the present invention is similar to that of conventional multiplication, and for that reason it is most efficient to utilize conventional mechanisms to secure a program of shifting and clearing, and to then initiate the multiplication operation by operation of the override pawl, and the rocking of shaft 419 as a result thereof. Thus, I prefer to utilize the latch 421 as a means for initiating the multiplication operation of the present invention, when the machine has been conditioned for such operation. Such rocking of the latch 421 will not be effective to initiate the conventional multiplication operation as the arm 410 will be latched in its inoperative position by means of latch 407, the U lever 404 being locked in its inoperative position, shown in Fig. 16, by means which will hereafter be described.

L. *Division mechanism*

It is assumed that the mechanism of my present invention would normally be used only in a machine provided with an automatic division mechanism, such as that shown in the patent to Friden No. 2,229,889. One of the primary objects of the present invention is to provide a means whereby a quotient value secured as a result of a division operation and standing in the counter dials 54 can be used as a multiplier factor without copying that factor manually into the multiplier keyboard 400. It will be obvious to those skilled in the art, that values can be placed in the counter register dials 54 by other means, such as a setting therein from the keyboard or by a transfer from the accumulator dials 51, or by other means not here pertinent. The means by which values are placed in the counter dials 54 is not important to the present invention, for this invention deals only with means for using that value as a multiplier factor. It is to be noted, however, that in most instances, the apparatus of the present invention will be placed in a machine having a division mechanism. However, as the division mechanism is not important in the operation of the present invention, it will not be described, reference being made to the patent just mentioned to illustrate one means by which a factor can be placed in the counter dials 54.

II. COUNTER MULTIPLIER MECHANISM

The present invention is directed primarily to a mechanism which is operative to utilize a value standing in the counter dials 54 as a multiplier, and to program a multiplication operation in which these values are taken order by order as the multiplier factor. Insofar as the present invention is concerned, it is immaterial how the counter value is secured—it can be a quotient resulting from a conventional division operation, or it can be a keyboard or accumulator value placed in the counter through the interregister transfer mechanism of my copending application, S. N. 569,326. The mechanism of the present invention is illustrated as being in addition to the conventional multiplier mechanism heretofore mentioned, although it will be obvious to those skilled in the art that it could be utilized as a substitute therefor, when combined with the interregister transfer mechanism of my copending application just mentioned.

It is believed that the mechanism will be more readily understood if first the theory of operation is explained. It will be obvious to those familiar with the patent to Friden, No. 2,229,889, or the machine manufactured in accordance with the teachings of that patent, that the present multiplying mechanism utilizes essentially the same program apparatus as used in the division mechanism of that patent, and operates from what might be called an overdraft, i. e., a tens-transfer, in the counter register dials 54.

1. *Theory of operation*

The theory of operation of the present mechanism is to perform a multiplication operation by a continuous entry of the multiplicand factor set in the keyboard keys 70 (additively in conventional multiplication in which a true product is secured). This operation continues in each order for a number of times corresponding to the value standing in the counter dial 54 of the respective order. It will be recalled that normally the counter actuator 160 is operated in each cycle of machine operation in which a value set in the keyboard is entered into the accumulator register dials 51. In the present instance, the counter actuator 160 is set for operation in a subtractive direction, so that while a multiplicand value is being added in the accumulator dials 51, the ordinal counter value is being reduced by a single value, or count (i. e., by "1") in each cycle of operation. Thus, the value set in the keyboard 70 is added into the accumulator register dials 51 cyclically, while the counter actuator is operating in a subtractive direction to subtract "1" therefrom, until the counter dial in the units order of the actuating mechanism is reduced to "0".

It will be obvious to those skilled in the art that it would be possible to sense the "0" condition of the proper counter dial 54 and to thereupon initiate a shift of the carriage one ordinal step to the right. However, I have found that it is more economical of parts and more positive of operation to sense the tens-transfer between the operative order of the counter and the next higher order as the operative order goes from "0" to "9"—which is the same basic concept as the overdraft sensing mechanism of the conventional division programming apparatus of the patent above-mentioned. Thus, the multiplicand value is entered an additional time into the accumulator while the counter dial is going from "0" to "9"—the latter operation causing tens-transfer and consequently a rocking of the second order sleeve 164 of the counter mechanism to accommodate the tens-transfer. This rocking of the second order sleeve 164 is readily sensed, as will hereinafter be described, and is utilized to operate a programming mechanism essentially the same as that of the division mechanism just mentioned, and, in the preferred form of my invention, utilizing for the most part, identical parts.

It will be recalled that in subtractive operation of the counter actuator 160, the entire assembly, including shaft 161, is first translated to the left, then rocked rearwardly (clockwise in Figs. 2, 6 and 7), then translated to the right, and finally rocked back to the original position. Whenever, in subtractive operation, the counter dial aligned with the units order of the counter actuator stands at "0," then the sensing finger 165 on the adjacent (tens order) sleeve 164 lies opposite the slot 65 in the counter disk 64 of the units order, so that the adjacent sleeve 164 is enabled to rock simultaneously with the units order sleeve 169. In my invention, I prefer to provide a tail integral with the sensing finger 165, which, when the tens-order sleeve 164 is permitted to rock, rises behind an abutment attached to a tie rod, whereupon the return translation of the actuator shaft 161 to the right, positively pulls the tie rod to the right. Such movement of the tie rod, working through a walking beam lever, thrusts a mutilated gear, identical with the gear 642 of Patent 2,229,889 (Fig. 12, thereof) into the plane of a drive gear corresponding to the mutilated gear 648 of the same patent, whereupon the mutilated gear is rotated through angles of 120° in the three succeeding cycles. A cam follower (similar to the cam follower 586 of Fig. 8 of said patent), engages an eccentric cam (corresponding to cam 652) mounted on the same shaft as the mutilated gear, the motion of the follower being effective to shift the digitation control gate 113 from its additive position to its subtractive position as a result of the first 120° of rotation of the mutilated gear. Thereupon, the keyboard value, which was added into the accumulator during the cycle in which the tens-transfer, or overdraft, occurred in the counter, is subtracted from the value standing in the register. The second 120° of rotation of the mutilated gear moves the gate 113 to its neutral position and initiates operation of the right shift clutch in order to shift the carriage one ordinal step to the right. The third increment of 120° of the mutilated gear, returns the digitation control gate to its additive position and continues the successive additive operations in the next higher order.

It is thus evident that the operation of the mechanism of my invention is essentially the programming mechanism required for division operations in the above-mentioned patent. In the present invention, the operation of the programming mechanism is actuated by a tens-transfer in the counter rather than an overdraft in the accumulator register, as is necessary in division. Such a mechanism provides for an extra cycle of additive operation in each order, followed by a corrective subtractive cycle, then a shift of the register, and finally, a re-initiation of the continuous additive operation in the next order. There are two extra cycles in each order—the cycle which causes the overdraft in the counter and the corrective cycle which immediately follows, but in machines operating at the high speed now prevalent in the art, these additional two cycles are ordinarily not noticeable and are, therefore, immaterial. On the other hand, the simplicity of the mechanism of the present invention, and its positive operation, provide for a trouble-free and long-lasting machine as well as one which is more economical to manufacture.

It has been mentioned that I prefer to shift the carriage to the extreme left-hand position, and to clear the accumulator automatically at the start of each multiplication problem. It is obvious that it is necessary to avoid clearing the counter register dials 54 at this time, as the counter contains the multiplier factor. It is therefore necessary to disable the counter clearing mechanism, and in the machine illustrated, this is readily secured by rocking the counter clear knob 235 to its inoperative (counter-clockwise) position shown in Fig. 1, whereupon the link 249 is rocked away from the pin 247 on the clearing bracket 245. Thereupon, the subsequent operation of the clearing bar and integral bracket, at the terminal position of the carriage, will be ineffective to clear the counter dials. It is contemplated that the counter clearing mechanism could be disabled by the manipulation of the control key for the present invention, but for purposes of illustration, no such automatic means is shown—it being preferred to illustrate the invention with the simpler mechanism controlled by the manual manipulation of knob 235. It will be understood, however, in the description which follows, that it is assumed that by some means or other, the counter clearing mechanism is disabled so that the value standing in the counter dials will not be erased at the time that the accumulator dials are cleared.

2. *Multiplier control key (positive)*

The mechanism of the present invention provides a means for multiplying either additively or subtractively in order to provide either the true product or the complement thereof. Normally, an operator will use additive, or positive, multiplication much more than subtractive, or complementary, so that additive multiplication will be first described. Preferably, this additive mechanism will be under the control of a suitable key 500 (see Figs. 1, 16 and 17). This key, as is best shown in Fig. 17, is mounted on the forward end of a long and forwardly extending arm 501 of a bellcrank 502. This bellcrank is rigidly mounted on a sleeve 503, the sleeve being rotatably mounted on a transverse shaft 504 journalled in the left side control plate 45, the left side frame 43, and right side frame 42 (Fig. 5). The bellcrank 502 is provided with a downwardly extending arm 505 (Fig. 17), which carries a latching roller 506.

A latching bellcrank 510 is pivotally mounted on the control plate 45 by any suitable means, such as flat head screw 511. This latch is provided with a notch 512 at its rearward end, which is adapted to engage the latching roller 506 whenever the bellcrank is rocked (clockwise from the position shown in Figs. 16 and 17). A spring 513 tensioned between a stud 514 on the bellcrank 510 and a seat in a subtractive bellcrank, as shown in Fig. 16, biases the latch 510 to its operative position (clockwise from that shown in Figs. 16 and 17). Thus, whenever the key 500 is depressed, the bellcrank 502 is rocked (clockwise in Figs. 16 and 17) and latched in the adjusted position by means of the bellcrank latch 510.

The operation of the latch 510 is also effective to unlatch a resiliently operated conditioning means which is adapted to set the digitation control gate 113 to the additive position upon operation of the override pawl previously described. Normally this control mechanism, which includes the cam link 595 (Fig. 16), is latched in an inoperative position by a latch member 520 which is pivotally mounted on the control plate 45 by any suitable means, such as screw stud 521. The lower arm of the bellcrank latch 510 carries a pin 515 which engages a slot 522 in the latch member 520. Therefore, the rocking of the latch 510 to its latching position (clockwise in Fig. 16) lifts the latch member 520 away from the latching shoulder 597 of the cam link 595, thereby unlatching the latter. It can be mentioned here, that the cam link is resiliently biased to its inoperative position shown in this figure, but will be resiliently biased more strongly towards an operative position by every operation of the override pawl, and the consequent rocking of shaft 419 previously mentioned. This link controls the operation of the gate setting mechanism which will be described hereafter under that heading.

3. *Counter control*

The rocking of the sleeve 503, caused by depression of control key 500, is effective to set the counter control means for operation in the reverse, or unlike sign character, direction. This can be secured by means of an arm 530 (Figs. 5 and 18) which is rigidly mounted on the right end of the sleeve 503. This arm 530 carries a pin 531 at its forward, or free, end, as shown in Figs. 5 and 18. The pin 531 is embraced within a slot 532 formed in an arm 533 which is pivotally mounted on the frame plate 43 by any suitable means, such as screw stud 534. The second arm 533 likewise carries a pin 535 at its free (the rearward) end, and this pin engages the upper edge of an arm 536 rigidly mounted on the left end of a cross shaft 537 (Fig. 5) journalled in the left frame plate 43 and the right frame plate 42. It can be mentioned at this point that the shaft 537 is also slidably mounted in the frame plates 42 and 43 and is biased to its leftward position by any suitable means, such as a compression spring 538, which embraces the left end of the shaft and is seated between the hub of the arm 536 and the left side frame plate 43.

The shaft 537 extends through the right frame plate 42 (as is shown in Figs. 3 and 5) and at its right-hand end carries an arm 545 rigidly mounted thereon. A bellcrank arm 546 is pivotally mounted on the shaft 537 adjacent to the arm 545, and the two arms being resiliently connected one to the other by means of a tension spring 547. The rearward, or free, end of the rearward arm of the bellcrank 546 is formed to provide a slide face 548 immediately below a pin 225 riveted on, or otherwise rigidly secured to, the counter control link 220. Thus, the rocking of the shaft 537, which is occasioned by the rocking of the sleeve 503, resiliently biases the bellcrank 546 to its raised position (counter-clockwise from that shown in Fig. 3). The rocking of the bellcrank 546 causes the slide face 548 to engage pin 225, thereby lifting the link to the reverse counting position in which position the counter will operate subtractively whenever the accumulator operates positively and vice versa. By this means, the counter is set for subtractive operation upon additive operation of the accumulator in the multiplication resulting from the operation of my invention.

4. *Condition transfer sensing control*

The rocking of the shaft 537 is also effective to condition the tens-transfer sensing mechanism associated with the counter dials 54. A preferred form of this mechanism is shown in Figs. 5 and 6. It is seen in these figures that the sensing finger 165 of the rightmost sleeve 164 (the sleeve associated with the tens-order of a counter actuator 160) has an integral, forwardly extending, tail 172. It will be recalled that this rightmost sleeve 164 is permitted to rock whenever a tens-transfer is to be effected between the units and tens orders of the counter actuator. In that event, the sensing finger 165 of the first sleeve 164 is aligned with the slot 65 of the units order counter assembly, and the force of its spring 168 will therefore rock the sleeve (clockwise in Figs. 2 and 6), so that the actuating finger on the left end thereof can engage the teeth of the tens order-gear 63.

Associated with the tail 172 is an arm 555 rigidly affixed to the shaft 537 (Figs. 5 and 6). At its forward, or free, end the arm is provided with a long pin 556, the right-hand end of which is formed as an integral disk 557. As shown in Fig. 6, the shaft 537 together with the arm 555 and pin 556 are resiliently biased to the inoperative, clockwise position shown in this figure, and also in Fig. 3, by any suitable means, such as a spring 558. This spring is tensioned between the pin 556 and a suitable stud 559 (Fig. 2) riveted on, or otherwise rigidly secured to, a cross-frame member 560 which preferably is also utilized as a support fo the rollers 59.

Whenever the shaft 537 is rocked by depression of the control key 500 (counterclockwise in Figs. 2, 3 and 6) the arm 555 and pin 556 are likewise rocked in the same direction. In the adjusted position of the shaft 537, the disk 557 will just clear the tail 172 of the right-hand sleeve 164 so long as the sleeve is in its normal inoperative position. However, upon rocking of the sleeve, which occurs when a tens-transfer is to be effected from the units order of the counter to the tens-order thereof, the tail 172 rocks (clockwise in Fig. 2) to engage the disk 557. It will be recalled that in subtractive operation of the counter, the counter actuator, including the shaft 161, and particularly the spools 164 thereon, are first shifted to the left, then rocked to its operative position (clockwise in these figures), then shifted back to the right, and finally, rocked to the inoperative position, shown in these figures. Thus, in subtractive operation, the sleeve 164 is shifted to the left in the first part of the cycle of operation so that the tail 172 lies to the left of the disk 557. Then, in those cycles in which a tens-transfer occurs, the tail 172 rocks upwardly (clockwise in Figs. 2 and 6) to engage pin 556. In that position, the return movement of the counter to the right causes the arm 172 to engage the disk 557 and shift the shaft 537 to the right against the force of compression spring 538. This shifting of the shaft will enable operation of the programming mechanism to be described hereafter under that heading. For the moment, however, it can can be noted that the rocking of the shaft 537 (counterclockwise in Figs. 2, 3 and 6) positions the disk 557 so that it may be engaged by the tail 172 whenever the right-hand sleeve 164 is rocked to cause a tens-transfer from the units order of the counter actuator to the tens-order thereof. The counter is always operated subtractively in multiplication by the present invention, so that the shaft 537 will be translated axially on each tens-transfer operation between the units and tens orders of the counter. On the reverse, or corrective, cycle, the counter actuator 160, and consequently sleeve 164 and tail 172, will be rocked upwardly before being shifted to the left, so will engage the disk 557 only during such leftward movement. This leftward shifting of bar 537 is an idle operation, for nothing occurs from such movement. Further, translation of the control shaft 537 can occur only during the multiplication operation initiated by the control key 500, for in all other operations the disk 557 will be angularly disposed with regard to tail 172 so that it cannot become engaged by the tail.

5. *Initiate machine operation*

The manipulation of the key 500 will also be effective to initiate machine operation, the mechanism for this purpose being shown in Fig. 16. A link 565 is pivotally mounted on the lower end of the vertical arm 505 of the bellcrank 502 by any suitable means, such as stud 566. The forward end of the link is formed with a slot 567 which embraces a pin 568 mounted in the upper end of an arm 569. The arm 569, as shown in Fig. 16, is securely mounted on the transverse shaft 150.

It will be recalled that the right end of the shaft 150 carries the lever 151 (see Fig. 4) whereby the rocking of the shaft 150 (counter-clockwise in Figs. 16 and 4) causes the energizing of the machine motor, not shown, and the engagement of the main clutch through the operation of switch control link 138 and the rocking of clutch pawl 132. It will also be recalled that the rocking of shaft 150 is effective to set the power operated shift and clearing mechanisms, shown particularly in Figs. 14 and 15. Thus, the depression of the control key 500 and the consequent rocking of the bellcrank 502 has translated the link 565 rearwardly and thereby rocked arm 569 and shaft 150 (counter-clockwise in Fig. 16). This rocking of the shaft closes the motor switch to energize the motor, engages the main clutch, sets the reciprocating hook member 376 (Figs. 14 and 15) to initiate operation of the left shift clutch and the clear clutch, whereby the carriage is shifted to the extreme left-hand position and the accumulator register is cleared. The shifting and clearing operation are terminated by the operation of the override pawl 350 (Fig. 11) previously described, which is effective to rock the bail 356 and thereby disable both clutches. However, the key 500 has been latched in its operative position by the latch arm 510, so that the shaft 150 is retained in its counter-clockwise, or operative, position, thereby maintaining the motor running and the clutch engaged until the multiplication operation is completed and the latch 510 is released.

6. *Multiplier interlock*

It has been mentioned that I prefer to illustrate my invention in a machine provided with the conventional multiplying mechanism described in the patents to Friden, Nos. 2,371,752 and 2,399,917. Obviously, it is highly desirable to provide an interlock which will be effective to prevent operation of the conventional multiplier mechanism simultaneously with the counter multiplier mechanism of the present invention. Such an interlock is readily provided by the mechanism shown in Fig. 16.

The preferred interlock is very simple, and preferably includes a link 580, the rear end of which is pivotally mounted on the link 565 by any suitable means, such as stud 581. The front end of the link is supported by an arm 582 to which it is pivotally mounted, as by stud 583. The arm 582 is pivotally mounted on the frame plate 45 by any suitable means such as the screw stud 584 and is provided with a notch 585 on its rearward edge. This notch is adapted to engage a pin 412 carried by the rear end of the upper arm of the U-shaped lever 404. It will be recalled that this lever 404 is rocked in every operation of any of the conventional multiplier control keys. However, if the counter multiplier control key 500 is depressed, the links 565 and 580 are translated rearwardly, thereby rocking the arm 582 (clockwise in this figure) to cause engagement of the notch 585 with pin 412. In this condition of the parts, the U-shaped lever 404 is locked against rocking movement, thereby preventing release of latch 407 and the operation of the conventional power initiating arm 410. On the other hand, if conventional multiplication is first initiated, then the lever 404 is rocked and in that event the pin 412 blocks rocking of the arm 582. Such rocking prevents the operation of the counter multiplier control key 500 to an extent sufficient to set the mechanisms of the present invention.

A spring 586 tensioned between arm 582 and link 580 holds key 500 and bellcrank 502 in their elevated positions shown.

7. Setting digitation control gate

It will be recalled that operation of the conventional multiplier mechanism is initiated by the operation of the override pawl 350 and the consequent rocking of bail 356. It was previously mentioned that the leftward extension 359 of the bail 356 rocked bellcrank 360 (Fig. 13), which, through the medium of link 417, rocked arm 418 and shaft 419. The left end of the shaft 419 carries the latch member 421 (Fig. 16) which constitutes the second latching means for the conventional multiplication initiating arm 410. It is much simpler, in the machine illustrated, to use this same operation to position the digitation control gate 113 in its operative position, and thereby initiate the actual multiplication operation. Obviously, the program to this point is identical to that of the conventional operation in multiplication according to the Friden patents above-mentioned. It should be remembered that the machine is cycling continuously at this point, for the motor is held operative and the clutch is held engaged by the latching of shaft 150 in its rocked position, as previously described. During the shifting and clearing operations, the digitation control gate 113 will be held in its neutral, or inoperative, position by a conventional centralizer, not shown. Thus, it is only necessary to throw the gate 113 and consequently spool 110, into its operative position in the latter portion of the cycle which causes the operation of the override pawl. This can safely be done as the digitation phase of the cycle in the conventional machine of the patents described occurs in about the first 120°, the balance of the cycle being utilized for tens-transfer operations. Thus, more than half of the cycle is available for shifting of the digitation control spool 110 to its operative position at a time when the square shaft 91, necessarily, will be at rest. The mechanism for this purpose is shown in Figs. 16, 19 and 22.

The operation of the gate setting mechanism can readily be controlled by the rocking of the latch member 421, which results from the operation of the override pawl. It is seen in Fig. 16 that the rear end of this latch member overlies a pin 590 riveted on, or otherwise rigidly mounted in, the lower and forwardly projecting end of a rocker 591 that is rotatably mounted on the shaft 150. This rocker is resiliently biased to its inoperative position (the counter-clockwise position of Fig. 16) by any suitable means such as spring 592 tensioned between a seat in the upper arm of the rocker and a suitable stud on the frame plate, not shown. The rocking of the shaft 419 and latch 421 (counter-clockwise in Fig. 16) is therefore effective to rock the rocker 591 (clockwise in this figure) from its inoperative position to which it is biased by the force of the spring 592.

The upper end of the vertical arm of the rocker 591 is provided with a pin 593. This pin is embraced within a slot 594 of a rearwardly extending cam link 595. The link and the arm are resiliently held in the retracted position shown by a suitable spring 596 tensioned between the pin 593 and a stud on the link, as shown. Obviously, the movement of the rocker 591, resulting from each operation of the override pawl, will resiliently bias the link 595 to its forward position. However, in all operations except that initiated by the depression of the counter multiply key 500, this link is latched in its rearward, inoperative, position by the latch member 520, previously mentioned. The rear end of the link 595 is provided with a latching shoulder 597 adapted to engage the latch 520 and a slot 598 which embraces a transverse shaft 599.

The shaft 599 is slidably and rotatably journalled in the left side frame 43 and the left-hand control plate 45, as shown in Fig. 24. This shaft is resiliently biased to the right by any suitable means, such as the compression spring 605 surrounding the shaft and seated between the left side control plate 45 and a collar 606 on the shaft. A gear 607 is rigidly secured to the left end of the shaft 599 (Figs. 16, 19 and 24), the hub 608 of the gear engaging the left face of the link 595. The rear end of this link carries a leftwardly projecting cam 690 adapted to shift the gear 607 to the left upon forward translation of the link 595. Thus, the gear 607 and its shaft 599, are normally biased to the right to an inoperative position by the spring 605, but are translated to the left to an operative position by the operation of the link 595 by the override pawl and its related mechanism. The gear 607 is driven constantly from the drive shaft 102 by means of gearing which includes drive gear 615 (Figs. 16, 19 and 24) which meshes with a wide idler 616. The wide idler is rotatably mounted on a stub shaft 617 rigidly secured to the left side control plate 45. The wide idler 616 is constantly enmeshed with the driven gear 607 so that all three gears, 615, 616 and 607 rotate constantly when the machine is in operation—the wide idler permitting the gear 607 to be shifted laterally by the link 595, as previously described.

The gear 607 is provided with a roller 609 which is adapted to engage a forwardly extending tail 621 of a bellcrank setting arm 620 shortly before the end of a cycle (these parts in Fig. 22 being shown at approximately the 300° position). The bellcrank 620 is pivotally mounted at its elbow on a stud 622 carried by a cam follower arm 623. The follower arm 623 is pivotally mounted on a screw stud 624 which is threaded into the left side control plate 45, the arm being spaced from the plate by a suitable spacer 625. The arm has an enlarged cam slot 626 in its upper end, which slot embraces the program cam, or eccentric, 660. When the cam 660 and follower 623 are in their normal positions shown in Fig. 16 (the A position shown in Fig. 20), they are conditioned for the multiplication phase of the operation, but actual operation will only be initiated by rocking of bellcrank 620. This rocking of bellcrank 620 is caused by the pin 609 engaging the upper edge of the tail 621 when the gear 607 is projected to its leftward, or operative, position, thereby rocking the bellcrank 620 clockwise about its pivot 622, as will be seen by reference to Fig. 22.

The bellcrank 620 is normally biased to its inoperative (counter-clockwise) position by any suitable means, such as spring 638 tensioned between the rear arm 630 of the bellcrank and the cam follower arm 623, as shown in Figs. 16 and 22. Preferably, the bellcrank 620 is provided with a stop pin 639 which abuts against the follower arm 623 when the two members are in their retracted position shown.

A rocker arm 633 is slidably but nonrotatably mounted on the left end of the digitation control shaft 115, the rocking of which sets the digitation gate 113 in either of its operative (additive or subtractive) positions. The mounting of the rocker 633 on the shaft 115 to provide for axial movement along the shaft 115 in a manner to prevent relative rotation between the two, is shown particularly in Fig. 23. This mounting may comprise a slot 634 milled in the hub of the rocker 633, the ends of the shaft 115 being flattened, as at 635, to engage the notch 634. A screw stud 636 threaded into the end of shaft 115 holds the arm 633 on the shaft 115, a spring 637 biasing the rocker 633 to the left to the normal position shown in Fig. 24 (to the right in Figs. 22 and 23).

The bellcrank 620 has a rearwardly extending arm 630, the rearward end of which is provided with a substantially vertical notch 631 adapted to engage a pin 632 carried on the lower end of a rocker arm 633. In the normal position of the rocker 633, the pin 632 will be engaged by opposed cam faces 640 which form the end of the slot 631 when the bellcrank 620 is rocked by pin 609. Such engagement of cam face 640 with the pin 632 rocks the arm 633 and consequently shaft 115 (counterclockwise in Figs. 16 and 22). Such rocking of the shaft 115 causes the digitation control gate 113 to shift the digitation spool 110 rearwardly, thereby engaging the plus gears 111 with the accumulator gears 61. Thus, the operation of the override pawl is effective, through the rocking of shaft 419, latch member 421, arm 591, the translation of link 595, to cam the gear 607 to its leftward, or operative, position, and the engagement of roller 609 with tail 621 of the bellcrank, to set the digitation control gate 113 into its additive position. Thereupon, the subsequent cycles of machine operation causes the value set in the keyboard to be entered additively into the accumulator dials 51 so long as the cam follower arm 623 remains in the position shown in Figs. 16 and 20.

It will be recalled that the parts operated by the override pawl, including the shaft 419 and the latch member 421, are returned to their normal inoperative positions at the end of the override cycle. Consequently, the arm 591 will be released to the force of its spring 592 at the end of the override cycle, thereby enabling the link 595 to release gear 607. It is therefore necessary to latch the bellcrank 620 in its adjusted position during its rocking movement just described. This can readily be secured by a means of a latching bellcrank 645 (see Fig. 22), the lower end of the vertical arm of which is provided with a latching shoulder 646 adapted to engage a pin 641 mounted adjacent the rear end of the arm 630 and bellcrank 620. The latch is resiliently biased to its latching position by any suitable means, such as spring 647 tensioned between the vertical arm of bellcrank 645 and a stud on the frame plate, as shown in Fig. 16. This latch will hold the bellcrank 620 in its adjusted position throughout the multiplication operation initiated by the control key 500, the latch not being released until the end of the multiplication operation. It is therefore immaterial that the link 595 will be translated rearwardly by the force of spring 592 at the end of the override cycle, for the digitation control mechanism is latched in engagement with the bellcrank 620, and the gate 113 can be shifted only under the control of that bellcrank.

In the cycle following the override cycle, in additive operation initiated by depression of the key 500, the gate 113 and spool 110 will be in their additive positions, and the values set in the keyboard will be introduced into the accumulator dials 51 through the digitating mechanism shown in Fig. 2. This additive operation will continue indefinitely until the programmed operation, which includes a subtractive cycle to correct the "overdraft" in the counter and a shifting of the accumulator carriage 50 one ordinal step. This program mechanism, which is under the control of the translation of the shaft 537, will be described in the next section. For the moment, however, it can be mentioned that this program mechanism is effective to rotate cam 660 (to the B position of Fig. 20), thereby rocking follower arm 623 to move the bellcrank 620 rearwardly of the machine. Such movement of bellcrank 620 rocks the control arm 633 clockwise to position shaft 115, gate 113, and spool 110 in the forward, or subtractive, positions. This shifting occurs in the latter portion of the cycle in which the "overdraft" is sensed, so that in the succeeding cycle the keyboard value is subtracted from the accumulator, and the counter dial in line with the units order actuator is returned to "0." This cycle of operation is immediately followed by rotation of cam 660 (to the C position of Fig. 20) which causes a shift of the carriage, and the return of the bellcrank 620 to its neutral position. Finally, at the end of that cycle, the cam is returned to the original position (A position of Fig. 20) and the machine is again conditioned for additive operation.

8. *Programming mechanism*

It has already been mentioned that an "overdraft" in the units order counter dial 54, actually a tens-transfer from the counter dial aligned with the units order of the counter actuator to the next higher order, is effective to cause a translation of the shaft 537 to the right. The shifting of shaft 537 is caused by the engagement of tail 172 (Fig. 6) with the disk 557, when the tens-order sleeve 164 is permitted to rock, and the shaft 537 has been rocked to its operative position. It has been mentioned, also, that the shaft 537 is rotatably and slidably journalled in the side frames 43 and 42, and is resiliently biased to the left by the spring 538 which encompasses the left end thereof. The arm 536 on the left end of the shaft 537 lies immediately adjacent the upper end of a two-armed lever, or walking beam, 650 when the shaft is in its normal position (see Figs. 5 and 24). The rocking beam 650, as shown in Fig. 24, is mounted on a bracket 651 extending to the right from the left side frame plate 43 by any suitable means, such as screw stud 652. The translation of the shaft 537 to the right will therefore rock the beam 650 (counter-clockwise in Fig. 24) about its pivot.

The lower end of the beam 650 is provided with a nose 653 which bears against a plate 654 on the right end of a short shaft 655 slidably and rotatably journalled in the left side frame 43 and the left side auxiliary plate 45. The shaft 655, and consequently the parts which are mounted thereon, is biased to the right to an inoperative position by any suitable means, such as the compression spring 656 embracing the right end of the shaft and seated between the frame plate 43 and the shaft plate 654. The sensing of the tens-transfer in the counter dial 54 aligned with the units order of the counter actuator is effective, through the translation of the shaft 657, and the consequent rocking of the beam 650 to shift the shaft 655 to the left against the force of its spring 656.

The shaft 655 (see Figs. 16, 20, 22 and 24) carries an eccentric cam 660 pinned, or otherwise rigidly secured thereon. This cam member lies within the slot 626 formed in the upper end of the follower arm 623. Obviously, the rotation of the shaft will be effective to rock the arm 623 and consequently, to shift the bellcrank 620 to different longitudinal positions. Specifically, the rotation of the cam (in three incremental steps of 120° each, in a counter-clockwise direction in these figures) from the A position of Figs. 16 and 20, will shift the cam follower arm 623 and bellcrank 620: (1) rearwardly to the B position to set the digitation control shaft 115 and gate 113 (clockwise in Fig. 16) to cause engagement of the subtract gears 112 with the accumulator gears 91 and thereby set the machine for a cycle of subtraction; (2) an intermediate C position in which the digitation control gate 113 lies in the normal disengaged position shown in Fig. 16 in which neither the add gears nor the subtract gears 111 or 112, respectively, are engaged with the accumulator gears 61; and (3) to the initial A position in which the add gears 111 are enmeshed with the accumulator gears 61. These three positions are illustrated graphically in Fig. 20 by the phantom lines A, B and C, line A representing the normal position of the parts which sets the digitation control gate 113 for additive operation.

The shaft 655 carries a mutilated gear 665 (Figs. 19 and 24) normally lying immediately adjacent the left side of the auxiliary plate 45. This gear is identical with the mutilated gear (642 of the patent to Friden, No. 2,229,889) which controls the programming of the division mechanism. This gear is shown in profile in Fig. 19 and comprises three sets of three teeth, equiangularly disposed around the perimeter of the gear, and a notch 666 adapted to engage a pin 667 (see also Fig. 21) which is riveted on, or otherwise rigidly secured to, the control plate 45. When the gear is in its normal position, the pin 667 lies within the notch 666, thereby holding the programming mechanism in a disabling position. However, when the gear 665 is shifted outwardly from the control plate 45, by the longitudinal translation of the shaft 655 to the left from the position shown in Fig. 24, and the gear rotated slightly, the pin 667 engages the side of the gear 665. In this situation, the pin 667 holds the gear 665 in its adjusted position until the gear returns to its full-cycle position in which the notch and pin are aligned to permit the gear to move to the right under the force of the spring 656.

The mutilated gear 665, and consequently shaft 655 and cam 660 are driven by a second mutilated gear 668 lying immediately adjacent to the idler 616 previously mentioned. The mutilated driving gear 668 is rigidly secured to the idler 616 by any suitable means, preferably by riveting the two together in order to provide for the constant rotation of the mutilated gear 668 when the machine is in operation. This gear 668 is provided with a single set of two teeth, as shown in Fig. 19. Normally, the mutilated driven gear 665 lies in a plane to the right of the mutilated driving gear 668 (see Fig. 24), the driven gear being biased to that position by the compression spring 656 which encompasses shaft 655. However, the axial movement of the shaft 655 to the left upon the sensing of a tens-transfer in the counter dial aligned with the units order of the counter actuator, forces the gear 655 into the plane of the mutilated driving gear 668. Thereupon the driven gear 665 will be given three increments of angular movement of 120°, in each of the three succeeding cycles beginning in the cycle in which the tens-transfer occurs. That is, the shaft 655 and cam 660 are given angular increments from position A of Fig. 20 to positions B and C and back to A, thereby setting the digitation control gate from additive operation to a subtractive operation; then a shifting operation in which the gate is in a neutral, or inoperative, position; and finally, returning to an additive operation.

It is necessary to provide a means for latching the mutilated driven gear 665 in its projected position because the shaft 537 is released by the return rocking of the tail 172, which occurs between 90° and 120° before the end of the cycle, several degrees before the teeth of mutilated driving gear 668 engage the teeth of the driven gear 665. It will be recalled that the translation of the counter, in subtractive operation, occurs, roughly, in the third fifth of the cycle and that the actuator is rocked to its home position in the fourth fifth of the cycle. However, it is desirable that the driving of the mutilated gear and its shaft 655 occur somewhat later in the cycle. It is necessary, therefore, to provide a means for holding the shaft and gear in the projected position until they are rotated sufficiently to enable the face of the gear 665 to engage the end of the pin 667. This is readily secured by the simple latching means shown in Fig. 19, which comprises a latch arm 675 pivotally mounted on the control plate 45 by any suitable means, such as screw stud 676. This latching arm is resiliently biased into engagement with the mutilated gear 665 by any suitable means, such as the spring 677 tensioned between a spring seat on the tail of the arm and the stud 678 on the frame plate. The arm is biased into engagement with the mutilated gear 665 (counter-clockwise in Fig. 19) and, when the gear is projected outwardly away from the control plate, is adapted to fall behind the gear to hold it in its projected position shown in Fig. 21. This movement of the latching arm 675 behind the gear 665 is facilitated if the lower edge of the arm is cham-fered to provide a knife edge, or cam face, 679, as is shown in profile in Fig. 21.

The latching arm must be removed from behind the gear 665 before the end of the program cycle, and it is most convenient to rock it away from its latching position shortly after the gear 665 has been rotated through its first increment of 120°. This purpose is readily accomplished by means of a pin 685 (Figs. 19 and 24), extending inwardly from an enlarged hub of the gear 615. Preferably, this pin is located so as to engage the tail 680 of the arm 675 shortly after the start of a cycle, at about the 15° to 20° position of the main drive shaft 102.

The two teeth on the mutilated driving gear 668, in the full-cycle position of the drive shaft 102, lie at an angle to engage the teeth of gear 665, as shown in Fig. 19. That is, the teeth of driver gear 668 first engage the teeth of driven gear 665 shortly before the end of a cycle (actually about 20° before the end of the cycle) and do not become disengaged until after the next cycle is initiated. Thus, each incremental rotation of driven gear 665 occurs about half in the last 20° of rotation of main drive shaft 102 and about half in the first 20° of rotation in the next cycle. This timing is approximately the same as in division operations, and is used in order to provide for the completion of a digitation operation, and the completion of the tens-transfers effected thereby, before changing the setting of the digitation control gate 113.

It would, perhaps, be well to summarize the sequence of operations to this point, in a multiplication operation initiated by the control key 500. The depression of this key sets the counter control mechanism for subtractive operation, in this instance, operation in the reversed sign character direction, with respect to the operation of the accumulator. The depression of the key has rocked the transfer sensing shaft 537 and arm 555 into their effective positions. It has, also, by the rocking of shaft 150, initiated machine operation, the shifting of the carriage to the extreme left-hand position, and the automatic clearing of the accumulator register when the carriage reaches that position. During the clearing cycle, the override pawl will be operated, which, through the mechanism mentioned, rocks shaft 419 and latch member 421. The rocking of this member, through the longitudinal translation of link 595, cams gear 607 outwardly to its effective position. This operation occurs in the third quarter of the overdrafting cycle and is immediately followed by the engagement of the roller 609 with the tail 621 of bellcrank 620. Then, in the last quarter of the cycle, the roller will rock the bellcrank 620 (clockwise in Fig. 16) to its operative position, and the setting mechanism is latched in the rocked position by the latch member 645. The notch 631 in the rear end of the bellcrank 620, and the cam-shaped entrance 640 thereinto, are operative, upon the rocking of the bellcrank, to cam the rocker 633 (counter-clockwise in Fig. 16) to put the digitation control gate 113 in its additive position.

The machine continues to cycle thereafter, and in each cycle of operation the value standing on the keyboard will be entered into the accumulator register dials 51. In view of the fact that the counter is set for subtractive registration, each additive cycle in the accumulator is accompanied by a subtraction of a single digit in the units order of the counter register, eventually reducing the reading in the units order dial to "0." The following cycle of operation rotates the units order dial from "0" to "9," thereby enabling the tens-transfer mechanism to subtract a unit from the value standing in the tens-order dial. This operation of the tens-transfer mechanism is sensed by the arm 555 through the medium of the plate 557, which is engaged by the tail 172 of the counter actuator spool 164 in the tens-order of the actuator mechanism. This results in the axial translation of shaft 537 to the right, whereupon, the arm 536 affixed to the shaft rocks the walking beam 650 and translates shaft 655 to the left. Thereupon, the latch arm 675 falls behind the gear 665, holding the gear in the plane of its driving gear 668. At the end of the overdrafting cycle, the teeth on gear 668 will engage one of the sets of teeth on the mutilated gear 665, rotating the latter through an angle of 120°. Such rotations of the gear effects a similar rotation of the cam 660 from the "A" position of Fig. 20 to the B position of that figure. This rocks the cam follower arm 623 and the bellcrank 620 rearwardly (counter-clockwise in Fig. 16). Obviously, this movement of the bellcrank 620 rotates the rocker 633 (clockwise in this figure) to cause the subtraction gears 112 to mesh with the accumulator gear 61, thereby setting the machine for subtractive operation. This subtracting operation takes place in the first cycle following the overdraft and results in the subtraction of the keyboard value from the value standing in the register at the end of the overdrafting cycle (the value standing in the accumulator at the end of that cycle representing a product of the multiplicand by one more than the multiplier value), and simultaneously adds a unit of "1" in the units order of the counter to return the units order counter dial to "0" and restore the tens-order dial to its proper reading. At the end of this corrective cycle of operation, the mutilated gear 665, and its shaft 655 are given another increment of rotation, which positions the cam 660 in the C position. In this position of the cam 660, the follower arm 623 and bellcrank 620 are in an intermediate position halfway between additive position A and subtractive position B, and the digitation control gate 113 is in its neutral, or inoperative, position. Mechanism is thereupon operated to effect a shifting of the carriage, one ordinal space, as will now be described.

The mechanism for effecting the shifting operation of the carriage is also under the control of the angular position of shaft 655, the mechanism therefor being shown particularly in Figs. 24 and 25, and to a lesser extent in Figs. 11 and 16. A cam 690 is rigidly mounted on the shaft 655 to the right of control plate 45, as shown in Fig. 24. The profile of this cam is shown in Fig. 25 and comprises a single rise 691 extending over an angle of approximately 120°. A link 692 is associated with the cam, preferably lying between the cam and the auxiliary control plate 45. The forward end of this link is provided with a slot 693 which embraces the shaft 655. The link 692 also carries a pin 694 at its forward end, which pin is adapted to be engaged by the rise 691 of cam 690 after 120° rotation of the cam (or in the second cycle of operation following the tens-transfer in the counter), forcing the link to the right, or forwardly, of the machine. The rear end of the link 692 is also formed with a slot 695 which embraces a pin 696 carried by arm 700. The arm 700 is mounted on a transverse shaft journalled in the left side control plate 45 and the right-hand frame plate 42 (Fig. 11). The arm 700 and shaft 701 are biased to an inoperative position (clockwise in Fig. 25) by a spring 702 tensioned between the upper end of the arm and a stud on the frame plate, not shown. A spring 697 tensioned between the pin 696 and a stud 698 on link 692 holds the arm 700 and the link in the retracted position shown in Fig. 25.

It will be obvious, from the mechanism shown in Figs. 24 and 25, that the rotation of shaft 655 will, in its first increment, bring the rise 691 of cam 690 to the location of pin 694, the cam and shaft rotating in a counter-clockwise direction in Figs. 16 and 25. It is this first cycle of operation which causes the keyboard value to be subtracted from the accumulated value in order to correct for the extra cycle of operation. Then, in the second cycle of programmed operation (in which the cam 660 is in its C position and the digitation control gate 113 is in its neutral position), the rise 691 engages pin 694, translating the link forwardly. This translation can occur either at the very beginning of the second cycle of operation or at the end of the first cycle, for it is conventional in the machine described to have an interlock between the shifting clutch and the digitation mechanism which prevents the operation of the shift clutch until the full-cycle position has been reached. It is, therefore, possible to translate the link 692 forwardly (to the right of Fig. 25) for the yield of spring 697 permits such translation even though the shaft 701 and arm 700 are locked by an interlock (not shown) in their inoperative positions. In that eventuality, the spring 697 will rock arm 700 and shaft 701 at the end of that digitation cycle—the spring 697 being considerably stronger than spring 702.

The rotation of shaft 701 (counter-clockwise in Fig. 25) is operative to cause engagement of the right shift clutch by means of the linkage shown in Fig. 11. As shown in the figure, an arm 703 is securely mounted on the shaft 700 in a plane substantially aligned with the right shift clutch control rod 295. This arm extends upwardly from the shaft 701, and at its free end carries the rear end of a clutch control link 704 which is pivotally mounted thereon by any suitable means, such as screw stud 705. The forward end of the link 704 preferably terminates in a plane immediately adjacent the clutch control member 297 where it (the link) is provided with a stud, or shoulder, adapted to engage the clutch control plate 297 when the link is moved rearwardly. Thus, the rocking of shaft 701 (counter-clockwise in Fig. 25) pulls the link 704 rearwardly and the latter engages the clutch control plate 297 to pull the clutch control plate 297 and rod 295 to their operative positions and thereby effect engagement of the right shift clutch. Such operation initiates a right shift of the carriage in the second cycle of the program initiated by the "overdraft" in the counter.

At the end of this cycle, the cam 690 is rotated another increment of 120°, whereupon the rise 691 passes beyond engagement with the pin 694, thereby enabling the spring 702 to return the shaft 700 to its original inoperative position, whereupon the right clutch is disabled and the shifting mechanism comes to rest. This final rotation of shaft 655 and cam 690 occurs simultaneously with the rotation of the program cam 660 from the C to the A position, in Fig. 20. It will be recalled that in the A position, the digitation control linkage is set for additive operation, so that the keyboard value will again be added into the register, but this time, in the second ordinal position. This second series of operations continues until a transfer occurs in the counter dial aligned with the units order of the counter actuator. Thereupon, a new program of corrective subtraction, right shifting of the carriage, and reinitiation of repetitive addition is initiated. By this means, the multiplication operation proceeds from right to left through all of the orders of the counter in which a value stands.

In this connection, it will be understood that if a counter dial stands at 0, the first cycle of operation in that order will cause an "overdraft" or transfer, whereupon the machine goes through a programmed operation of corrective subtraction, right shift, and reinitiation of additive operation as before.

9. Shift interlock

It is desirable, although not absolutely essential, to provide an interlock which is effective to prevent rocking of arm 700 and shaft 701, and consequently, operation of right shift clutch, except in the second cycle of operation following the sensing of the transfer in the units order of the counter. This interlock is effective at all other times to latch the arm and shaft against rotation. Various forms of interlocks could be suggested, but a simple one is shown in Fig. 16. The interlock illustrated, comprises a latch arm 710 which is pivotally mounted on the frame plate by any suitable means, such as stud 711. In this form shown, this arm is biased into its operative position (the counter-clockwise position shown in Fig. 16) by gravity, for the axis of rotation is placed far forward of the center of gravity. I have found that gravity alone is sufficient to operate this latch, although it would be obvious that a light spring could be used to bias the arm into the latching position, if desired. A notch 712 is formed adjacent the rear end of the arm 710 which notch is adapted to engage a pin 706 riveted on, or otherwise rigidly secured to, the lower end of the rocker 700. Adjacent the notch is a diagonally sloping cam face 713 which is adapted to force the pin and arm 700 to the inoperative, clockwise position, as shown in this figure, whenever the arm 710 is forcibly rocked (counter-clockwise in this figure). However, the notch 712 and the short face forming a part thereof, and which is tangential to the circumference of the pin, positively prevents the rocking of the arm 700 and shaft 702, so long as the latching arm is in the position shown.

It will be recalled that the latch member 645 which is operative to latch the control bellcrank 620 in its operative position, was formed as a bellcrank. A link 714 is pivotally mounted on the forward end of the horizontal arm of the bellcrank by any suitable means such as stud 715. A slot 716 formed in the lower end of the link 714 embraces a pin 717 riveted to the forward arm of latching member 710, the pin normally lying in the lower end of the slot 716, as shown in this figure. Obviously, whenever the control bellcrank 620 rocks to its operative position, the latch 645 likewise rocks (clockwise in this figure), causing the link 714 to drop. Thereupon, the upper end of slot 716 engages the pin 717. Then, in the subtractive correction cycle, the bellcrank 720 is translated rearwardly and the latching arm, from the bias of its spring 647, rocks with it (clockwise in this figure). This additional rocking of the latch bellcrank 645 through the medium of link 614 rocks the latch member 710 to a disengaging position. This release of the interlock 710 is not objectionable, because the digitation control gate 113 was moved into its subtractive position before the notch 712 of the interlock was rocked away from the pin 706. The conventional interlock, not shown, which exists between the digitating and the shifting mechanisms, prevents operation of the shift clutch prior to the end of the subtractive cycle. At the end of the subtractive cycle, however, the arm 700 and shaft 701 can be rocked (counter-clockwise in Figs. 16 and 25) from the translation of link 692, as previously described. When the control bellcrank 620 returns to its additive position at the end of the shift cycle, however (as the cam 660 returns from the C position to the A position), the latch 645 returns to its original latching position (in a counter-clockwise direction in Fig. 16), to lift link 714 and thereby release the latching arm 710. During this cycle, the shaft 701 and arm 700 are returned to their inoperative position by the release of link 692 and by cam 690, so that the arm 710 again latches pin 706 on the arm 700. This interlock prevents accidental operation of the shift control shaft 701 in other machine operations, or during the additive cycles of multiplication by the mechanism of the present invention.

10. Operation terminating mechanism

It is, of course, necessary to terminate a multiplication operation by some automatic means. Obviously, this can readily be secured by any device which will release the latch 510 which holds the key bellcrank 502 in its operative position. Release of this latch permits the control key 500 to rise, thus terminating the operation of the motor and clutch through the return of shaft 150 to its normal position, and simultaneously disabling the counter control and the transfer sensing mechanism through return of shaft 537 to its original angular position. It is also necessary to release the latch 645 to render the control bellcrank 620 inoperative. Such a terminating device could be operated by the carriage shifting to the extreme right-hand position (the reverse of conventional division operations which usually are terminated by an overdraft in the extreme left-hand position of the carriage). However, in the machine with which my invention is preferably associated, it is very convenient to terminate operation as soon as an all "0" condition of the counter occurs. It will be recalled that the higher orders of the counter actuator sleeves 164 are enabled to rock (in subtractive operation) as soon as all of the counter dials to the right thereof, stand at "0." In that condition, in each order, the sleeve is permitted to rock to enable the counter finger 166 to engage the teeth of gear 63. It is thus simple to sense a tens-transfer condition, or "overdraft," in the highest order of the counter similar to the sensing in the units order thereof. A mechanism for this purpose is shown particularly in Figs. 5 and 7.

In the preferred form of my stopping mechanism, the left-hand sleeve 164 is provided with a tail 725 integral therewith, this tail rocking upwardly (clockwise when viewed from the right, as in Fig. 7), whenever all of the sleeves to the right thereof, are enabled to rock. Associated with the tail 725 is a plate 726 mounted on the right end of a shaft 727. The shaft 727 is slidably and rotatably mounted in the machine, preferably being mounted in the left frame plate 43 and the control plate 45. It is held in a centralized position by any suitable centralizing means, such as that shown in Fig. 5, which comprises a V-block 728 mounted on the shaft and engaged by the free end of a centralizing arm 729. The arm 729 can be mounted on any suitable means, such as being rotatably mounted on the sleeve 503 and held against longitudinal displacement by means of a collar 730 and a bracket 731 secured in the frame of the machine. This arm is strongly biased into engagement with the V-block by any suitable means, such as a spring 732, which is tensioned between a stud on the arm, and a stud on the bracket, as shown. The shaft 727 is so disposed with relation to the highest order actuator of the counter mechanism, that it will be engaged by the tail 725 in either rightward or leftward translation thereof, whenever the highest order sleeve 164 is rocked to its operating position. Such rocking can, of course, occur only when all of the counter dials intermediate the highest order actuator sleeve 164 and the units order actuator sleeve 169 are conditioned for a transfer, i. e., stand at "0" in subtraction. It can be noted, that such engagement will occur during the overdraft cycle, simultaneously with the operation of the shaft 537 by tail 172, in which case, the shaft 727 is pulled to the right. Such movement is an idle one, for it has no effect upon the mechanism. However, in the next, or subtractive corrective cycle (in which the counter actuator is operated additively), the tail 725 will engage the right-hand face of plate 726 and consequently will push the shaft 727 to the left into an operative position.

The shaft 727 is latched into its left-hand, or operative, position by any suitable latching means, such as latch arm 735 (Figs. 5, 16 and 17) which is pivotally mounted on shaft 504. This arm is biased into latching position by a suitable spring 736 tensioned between a stud 737 on the latch arm and a stop pin 738 on the bellcrank 502. The stop pin is effective, as is shown particularly in Fig. 16, to prevent operation of latch 735 whenever the key 500 is in its inoperative position. However, as soon as the key 500 is depressed, the bellcrank 502 is rocked (clockwise in Figs. 16 and 17) away from the arm 735, thereby resiliently biasing the arm into latching position. Such latching is prevented by engagement of the free end of the arm 735 with a collar 745 of arm 746 which is rigidly secured to the shaft 727. Preferably, the rear end of the latching arm 735 is chamfered, as shown in Figs. 5 and 17, to provide for ready movement of the arm behind the collar 745. The forward end of the arm 746 is provided with an ear 747 which overlies the latch member 510 whenever that latch is in its latching position. Obviously, the rocking of shaft 727 (clockwise in Figs. 16 and 17) will be effective to release the latch 510 and thereby release key 500 and the mechanism controlled thereby.

The means for rocking the shaft 727 to release latch 510 is shown particularly in Figs. 24 and 25. It is actuated by a roller 750 mounted on the right-hand side of cam 690. A cam follower, preferably in the form of a bellcrank 751, is associated with the cam roller 750, preferably being so located angularly with respect to the cam, that it will be engaged by the roller 750 shortly after the 120° position of the cam, or in the second cycle of operation initiated by the overdraft sensing mechanism. It will be recalled that this cam 690 is mounted on the mutilated gear shaft 655 and rotates synchronously with that shaft. The bellcrank 751, as is shown in Fig. 25, is preferably mounted at its elbow on the shaft 727 so that the rocking of the bellcrank (clockwise in Fig. 25) effects a similar rocking of the shaft 715 and, therefore, the release of latch 510 by the rocking of arm 746. The bellcrank is resiliently biased to its inoperative position by any suitable means, such as a spring 752 tensioned between a seat in the bellcrank and a stop pin 753.

The shaft 727 is resiliently held in its centralized position by the centralizer 728, 729 (Fig. 5). In this position, the bellcrank 751 lies to the right of the pin 750, as is shown in Fig. 24. It will be obvious that the translation of the shaft to the right during the transfer cycle will move the follower away from the cam and that the leftward translation of the shaft, which occurs during the transfer phase of the corrective cycle, will move the follower into the path of travel of pin 750. It will be recalled, that the shaft is latched in this leftward, or operative, position by the latch member 735, so that the follower 751 will be rocked during the carriage shifting cycle.

The rearwardly extending arm of the bellcrank 751 carries a long pin 754 (see also Figs. 16 and 24) which underlies the forward arm of the bellcrank latch 645 when that latch is in its rocked, or operative, position (clockwise from the position shown in Fig. 16). Thus, the rocking of shaft 655 in its second increment of rotation, i. e., during the attempted shifting cycle in the highest order of operation, simultaneously releases the latches 510 and 645, thereby releasing the key bellcrank 502 and the digitation control bellcrank 620. The release of the former releases shaft 150, thereby terminating machine operation; and the release of the latter returns the control bellcrank 620 and consequently all of the digitation control and programming mechanisms of the present invention, to their normal positions.

It is conventional, in the machine built in accordance with the teachings of the patents heretofore mentioned, to provide eleven dials 54 in the counter register and to provide for only ten ordinal shifts of the carriage. In such a machine, the eleventh order dial could never be sensed by the sensing arm 555, and any value standing in this dial would be beyond the capacity of the machine. This objection would not occur in a machine having ten orders in the counter and ten shifts of the carriage; nor would it appear in a machine having an additional shift. A mechanism for the additional shift has been suggested and described in my copending application, S. N. 485,393, filed February 1, 1955. It is to be assumed, therefore, that some means will be provided for operating all of the counter register dials and of sensing a tens-transfer from the highest order. Preferably, this would be the additional shifting step described in the application just mentioned.

11. *Complementary multiplication*

The mechanism of the present invention is readily adapted for subtractive, or complementary, operation, such as that initiated by the negative multiply key 403 of the conventional mechanism disclosed in the patents to Friden, Nos. 2,371,752 and 2,399,917. It will be understood, that this feature is not essential to operation of my invention, for in many instances it could be omitted without objection, as normally an operator desires only a true product resulting from the operation of the mechanism heretofore described. However, in view of the fact that it is very simple to provide the mechanism just described with means for reversing the operation of the accumulator register and holding the counter in subtractive operation, such means will be shown and described.

The operation of the negative multiply mechanism for the counter can be under the control of a suitable key 800 (see particularly Figs. 5, 16 and 17). This key, likewise, can be mounted on the forward arm of a bellcrank 801, which is rigidly mounted on the shaft 504. The operation of this key will be exactly the same as that of the control key 500, except that the counter actuator will be set for operation in the same sign character direction as the accumulator, i. e., the counter is set for subtractive operation during the subtractive cycles in the accumulator; and the control gate will be set in the first operative positioning of control bellcrank 620 for subtraction rather than addition.

One of the operations of the control key 800 and its bellcrank 801 will be to rock the bellcrank 502 to its operative position. This can readily be secured by means of a laterally projecting gear 802 which overlies the forwardly extending arm 501 of bellcrank 502 or by means of a pin 803 riveted in the forward end of the bellcrank 502 and underlying the key top of 800—both of which are shown in Fig. 17. Thus, the depression of the key 800 will simultaneously rock the key 500 to its operative position and set all of the control mechanisms which are activated thereby.

The bellcrank 801 is latched in its operative position by any suitable means, such as a latch member 810, the upwardly extending arm of which is provided with a hook 811 adapted to engage a pin 812 on the forward arm of bellcrank 801 when the latter is rocked to its operative position. The latch member is biased into latching position by any suitable means, such as a spring 813 tensioned between a stud on a forwardly extending arm 816 of the latch member, and a stud on the control plate 45, as shown in Fig. 16. This latch is released by the release of the latch member 510, previously described, by any suitable means, such as an ear 814 on the latch member 510 overlying a rearwardly extending arm 815 of the latch member 810. Thus, the operation of latch 810 is controlled by latch member 510, the two operating simultaneously when the negative control key 800 is depressed, and the latch member 810 being rocked to its disabled position at the termination of operation by the rocking of the latch member 510, as previously described.

It was just mentioned that the bellcrank 801 is rigidly mounted on the shaft 504, previously mentioned. The shaft 504 extends transversely across the machine, extending through the right frame plate 42, as seen in Fig. 5. On its right-hand end, this shaft carries a hook arm 820 (see also Fig. 3), having a hook, or abutment, 821 adapted to engage a pin 822 on a forward extension of the counter control arm 546. The depression of the key 800, therefore, rocks the shaft 504 (clockwise in Fig. 16 and counterclockwise in Fig. 3). Such rocking of the shaft 504 causes the arm 820 to assume the dotted line position of Fig. 3, thereby locking the counter control arm 546 against movement. In this event, the subsequent rocking of shaft 537 (this linkage described in connection with the rocking of shaft 537 necessarily having some lost motion within it) locks the arm of 546 against rocking, enabling the spring 547 to yield. Such locking of the arm 546 retains the yoke link 220 in the like direction position shown in Fig. 3. In this position of the counter control yoke, the counter operates in the same sign character direction as the accumulator, so that each time the keyboard value is entered subtractively into the accumulator, a value of "1" is being subtracted from the digital value standing in the counter dials.

The final effect of the rocking of the bellcrank 801 is to reverse a setting of the digitation control rocker 633. This is readily secured by the mechanism shown particularly in Figs. 16 and 22. It was previously mentioned that the arm 633 is slidably, but nonrotatably, mounted on the digitation control shaft 115, and that the arm 633 can be moved to the right against the force of its compression spring 637. Such axial movement of the arm 633 can be secured by providing the bellcrank 801 with a rearwardly extending arm 840 (as best seen in Fig. 16). The rearward end of this arm is provided with a rightwardly directed ear 841 (see Fig. 22), which carries a cam edge 842 bearing against the hub of arm 633. Thus, the rocking of the bellcrank 801 (clockwise in Fig. 16), through the effect of cam edge 842 on the hub of the arm, shifts the arm to the right (to the left in Fig. 22) to its adjusted position. The bellcrank 801 is locked in its adjusted position, so the rocker 633 is held in its retracted position throughout the multiplication operation.

When the rocker 633 is in the retractive position, a pin 843 on the upper arm thereof is engaged by a notch 832 formed in the rearward end of an offset arm 830 of bellcrank 620. This arm, as is shown in Fig. 22, is offset from the main portion of the bellcrank by means of hub 831, and lies at an angle such, that the rocking of the bellcrank causes this arm to engage the pin 843 whenever the rocker 633 is in its retracted, or right-hand, position. The slot 832 is provided with a chamfered mouth, or cam sides, 833 similar to the camming mouth of notch 631. The rocking of this arm 830, the rocker 633 being in its retracted position, causes the cam edge to engage the pin, thereby rocking the shaft 115 and the digitation control gate 113 clockwise rather than counter-clockwise. In this situation, the machine is set for subtractive operation, and the program controlled by cam 660, cam follower arm 623, and bellcrank 620, is effective to reverse the sign character of operations in the various digitation steps of the program. That is, when the transfer is sensed in the counter dial aligned with the units order of the actuator, the machine is reversed to its additive position to remove the "overdrafting" value from the accumulator, the digitation control gate 113 is then moved to its neutral position for the shift cycle of operation, and in the final cycle, the digitation control gate is returned to the subtractive position. Thus, the series of operations is the exact reverse of that provided by depression of the control key 500, alone.

I claim:

1. In a cyclically operable calculating machine having an ordinally arranged accumulator, a selection mechanism, an accumulator driving means controlled by said selection mechanism and operative to differentially drive said accumulator additively or subtractively, an ordinally arranged counter register, a counter actuator for operating said counter register to count cycles of machine operation, means for shifting the relative ordinal positions of the accumulator and the accumulator driving means and the counter register and counter actuator, respectively, and a power means for operating said driving means and said actuator and said shifting means, a mechanism for multiplying a value set in said selection mechanism by a value registered in the counter register which comprises a manual means for setting said counter actuator to operate said counter register subtractively and setting said driving means to operate said accumulator additively, a second manual means for setting said counter actuator to operate said counter register subtractively and setting said driving means to operate said accumulator subtractively, a normally inoperative sensing means operative to sense a predetermined condition in a predetermined order of said counter register, means operated by said sensing means when sensing said predetermined condition to disable operation of said driving means and to enable operation of said shifting means and then reinitiate operation of said driving means, means operated by each of said manual means for conditioning said sensing means for operation, and means operated by each of said manual means for initiating a continuous operation of said power means.

2. In a cyclically operable calculating machine having a shiftable carriage, an accumulator in said carriage for registering a product, a selection mechanism, an accumulator driving means under the control of said selection mechanism for differentially driving said accumulator, an ordinally arranged counter register in said carriage, means for cyclically operating said counter register additively or subtractively to count cycles of operation, means for effecting a tens-transfer between the respective orders of said counter register, and means for shifting the carriage, the combination which comprises a control key, means operated by said control key for setting said counter operating means for subtractive operation and initiating operation of said accumulator driving means, sensing means conditioned for operation by said key and operative to sense a tens-transfer in a predetermined order of said counter register, and means operated by said sensing means for controlling operation of said shifting means and said accumulator driving means in a predetermined program of operations.

3. In a cyclically operable calculating machine having a shiftable carriage, an ordinally arranged accumulator in said carriage for registering a product, a selection mechanism, an accumulator driving means under the control of said selection mechanism for differentially driving said accumulator, an ordinally arranged counter register in said carriage, a counter actuator for operating said counter register additively or subtractively to count cycles of machine operation, means for effecting a tens-transfer between the respective orders of said counter register, and means for shifting the relative ordinal position of the carriage, the combination which comprises a control key, means operated by said control key for setting said counter actuator for subtractive operation and initiating repetitive cycles of operations of said accumulator driving means, sensing means conditioned for operation by said key and operative to sense a tens-transfer in a predetermined order of said counter, and means operated by said sensing means for terminating said repetitive cycles of operations in one relative ordinal position of the carriage, for operating said shifting means and for reinitiating operation in the next ordinal position of the carriage.

4. In a calculating machine having an ordinally arranged accumulator for registering a product, a selection mechanism, an ordinally arranged accumulator driving means under the control of said selection mechanism for differentially driving said accumulator, an ordinally arranged counter register for counting cycles of machine operation, a counter actuator for said counter register selectively operable additively or subtractively, means for shifting the relative ordinal positions of the accumulator and counter register with respect to the driving means and actuator, and means for effecting a tens-transfer between the respective orders of said counter register, the combination comprising a control key, means operated by said control key for setting said counter actuator for subtractive operation and initiating repetitive cycles of operations of said accumulator driving means, sensing means conditioned for operation by said key and operative to sense a tens-transfer in a predetermined order of the counter register, means operated by said sensing means for terminating the repetitive cycles of operations in one relative ordinal position of the counter register and accumulator with respect to said actuator and driving means, for operating said shifting means, and for reinitiating operation of the driving means in the next ordinal position of the accumulator and counter register with respect to said driving means and said actuator.

5. In a calculating machine having an ordinally arranged accumulator for registering a product, a selection mechanism, an ordinally arranged accumulator driving means under the control of said selection mechanism for differentially driving said accumulator, an ordinally arranged counter register for counting cycles of machine operation, a counter actuator for operating one order of said counter register additively or subtractively, and means for shifting the relative ordinal positions of the accumulator and counter register with respect to the driving means and actuator, the combination comprising a control key, means operated by said control key for setting said counter actuator for subtractive operation and initiating repetitive cycles of operations of said accumulator driving means, sensing means conditioned for operation by said key and operative to sense a tens-transfer in the order of the counter register aligned with said actuator, means operated by said sensing means for terminating the repetitive cycles of operations in one relative ordinal position of the accumulator and counter register with respect to said driving means and actuator, for operating said shifting means, and for reinitiating operation in the next ordinal position of the accumulator and counter register with respect to said accumulator driving means and said actuator, a second sensing means for sensing a tens-transfer in the highest order of the counter register, and means operated by said second sensing means for terminating machine operation.

6. In a calculating machine having a frame, a shiftable carriage, an ordinally arranged accumulator mounted in said carriage, ordinally arranged counter register mounted in said carriage, a selection mechanism in said frame, an accumulator driving mechanism in said frame under the control of said selection mechanism for differentially driving said accumulator in either sign character direction, selectively, a counter actuator in said frame including a member operative in the units order of said accumulator driving mechanism for entering a value of "1" into said counter register additively or subtractively, means for shifting said carriage with respect to said frame, and power means for operating said accumulator driving means and said counter actuator, a mechanism for multiplying a value set in said selection mechanism by a value standing in said counter register which comprises a means for sensing a tens-transfer from the counter register dial aligned with the units order actuator to the next higher order dial, a program means operative to reverse the sign character registration in said accumulator and said counter, then initiate operation of the carriage shifting means to shift the carriage one ordinal position, and to reinitiate operation in the selective sign character direction, means operated by said sensing means for initiating operation of said program means, and manually controlled means for selecting the sign character registration and initiating operation of said power means.

7. In a calculating machine having a frame, a shiftable carriage, an ordinally arranged accumulator mounted in said carriage, an ordinally arranged counter register mounted in said carriage, a selection mechanism in said frame, an accumulator driving mechanism in said frame under the control of said selection mechanism for differentially driving said accumulator additively or subtractively, a counter actuator including a member operative in the units order of said accumulator driving mechanism for entering a value of "1" into said counter register additively or subtractively, means for shifting said carriage with respect to said frame, and power means for operating said accumulator driving means and said counter actuator, a mechanism for multiplying a value set in said selection mechanism by a value standing in said counter register which comprises a normally inoperative means for sensing a tens-transfer from the counter register dial aligned with the units order actuator to the next higher order dial, a program means operative to reverse the sign character registration in said accumulator and said counter then initiate operation of the carriage shifting means to shift the carriage one ordinal position, and to reinitiate operation in the selective sign character direction, means operated by said sensing means for initiating operation of said program means, and manually controlled means for setting said counter actuator for subtractive operation, for rendering said sensing means operative, and for initiating continuous cycles of machine operation.

8. In a calculating machine having an ordinally arranged accumulator in which a product may be registered, a keyboard for receiving a multiplicand factor, an accumulator driving means under the control of said keyboard for differentially driving said accumulator additively or subtractively, an ordinally arranged counter register, a counter actuator for operating said counter register to count the cycles of machine operation, and means for shifting the relative ordinal positions of said accumulator and said counter register with respect to said driving means and said counter actuator, respectively, a mechanism for multiplying a multiplicand value set in said keyboard by the value standing in said counter register which comprises means for sensing a tens-transfer in a selected order of said counter, means for conditioning said counter actuator for operation subtractively, a means controlled by said sensing means for initiating a series of operations including operating said driving means in a reverse sign character direction, for operating said shifting means to shift said accumulator and said counter register with respect to said driving means and said actuator, respectively, and for reinitiating a continuous series of operations in the next adjacent order.

9. In a calculating machine having an ordinally arranged accumulator in which a product may be registered, a keyboard for receiving a multiplicand factor, an ordinally arranged accumulator driving means under the control of said keyboard for differentially driving said accumulator in either sign character direction, a counter register, a counter actuator for operating said counter register to count the cycles of machine operation additively or subtractively, and means for shifting said accumulator and said counter register with respect to said accumulator driving means, a mechanism for multiplying a multiplicand value set in said keyboard by the value standing in said counter register which comprises means for sensing a tens-transfer in a selected order of said counter, manually controlled means for conditioning said counter actuator for operation subtractively, a means controlled by said sensing means for initiating a program of operation including reversing the sign character of registration in the accumulator, for operating said shifting means to shift said counter register and said accumulator with respect to said accumulator driving means, and for initiating a continuous series of operations in the next adjacent order.

10. In a calculating machine having a frame, a carriage shiftable relative to said frame, an ordinally arranged accumulator in said carriage for receiving a product, a keyboard in said frame for receiving a multiplicand factor, an accumulator driving means in said frame controlled by said keyboard for differentially driving said accumulator additively or subtractively, an ordinally arranged counter register in said carriage, a counter actuator in said frame for operating said counter register additively or subtractively, means for effecting a tens-transfer between the respective orders of said counter register to count the cycles of machine operation, and means for shifting said carriage with respect to said frame, a mechanism for multiplying a multiplicand value set in said keyboard by the value standing in said counter register which comprises means for sensing a tens-transfer in the lowest operative order of said counter; manually controlled means for conditioning said counter actuator for operation subtractively; a means controlled by said sensing means for initiating a program of operation including reversing the sign character of registration in the accumulator, for operating said shifting means to shift said carriage with respect to said frame and for initiating a continuous series of operations in the next adjacent order; means for sensing a tens-transfer in the highest order of said counter; and means operated by said last-mentioned sensing means for terminating machine operation.

11. In a cyclically operable calculating machine having an ordinally arranged accumulator, a selection mechanism, an accumulator driving means controlled by said selection mechanism and operative to differentially drive said accumulator, an ordinally arranged counter register, a counter actuator for operating said counter register to count cycles of machine operation, means for shifting the relative ordinal positions of the accumulator and the accumulator driving means and the counter register and counter actuator, respectively, a multiplier factor receiving means for setting a multiplier factor into the machine, and multiplying means for controlling operation of said driving means and said shifting means by said multiplier factor receiving means to multiply a value set into said selection mechanism by the value set in said multiplier factor receiving means, a mechanism for multiplying a value set in said selection mechanism by a value registered in the counter register which comprises a manual means for setting said counter actuator to operate said counter register subtractively, for initiating a continuous series of operation of said driving means, and for disabling the first-mentioned multiplying means, a sensing means operative to sense a zero or non-zero condition in a predetermined order of said counter register, and means operated by said sensing means when sensing a zero condition to disable operation of said driving means and to operate said shifting means and then reinitiate operation of said driving means.

12. In a calculating machine having an accumulator for registering a product, a selection mechanism, an accumulator driving means under the control of said selection mechanism for differentially driving said accumulator, a counter register, a counter actuator for operating said counter register to count the cycles of machine operation either additively or subtractively, means for shifting the relative ordinal positions of the accumulator and counter with respect to said driving means and said actuator, a multiplier factor receiving means for setting a multiplier factor into the machine, and multiplying means for controlling operation of said driving means and said shifting means by said multiplier factor receiving means to multiply a value set into said selection mechanism by the value set in said multiplier factor receiving means, the combination which comprises a control key, means operated by said control key for setting said counter actuator for subtractive operation, for initiating repetitive cycles of operations of said driving means, and for disabling the first mentioned multiplying means, means conditioned by said key and operated by said counter for terminating said repetitive cycles of operations in one relative ordinal position of the counter and accumulator with respect to said driving means and said actuator, respectively, for operating said shifting means, and for reinitiating operation of said driving means in the next ordinal position of the accumulator with respect to said accumulator driving means.

13. In a cyclically operable calculating machine having an ordinally arranged accumulator, a selection mechanism, an accumulator driving means controlled by said selection mechanism and operative to differentially drive said accumulator in either sign character direction, an ordinally arranged counter register, a counter actuator for operating said counter register to count cycles of machine operation selectively in a like or unlike sign character with respect to said accumulator, and means for shifting the relative ordinal positions of the accumulator and the accumulator driving means and the counter register and counter actuator, respectively, a mechanism for multiplying a value set in said selection mechanism by a value registered in the counter register which comprises a first manual means initiating a continuous series of operations of said driving means to operate the accumulator in a preselected sign character direction and for setting said counter actuator to operate said counter register in an unlike sign character, a second manual means for initiating a continuous series of operation of said driving means to operate the accumulator in the other sign character direction and for setting said counter actuator to operate said counter register in a like sign character, a normally inoperative sensing means operative to sense a tens-transfer condition in a predetermined order of said counter register, means operated by said sensing means when sensing said tens-trensfer condition to disable operation of said driving means and to operate said shifting means and then reinitiate operation of said driving means, and means operated by both of said manual means for conditioning said sensing means for operation.

14. In a cyclically operable calculating machine having an ordinally arranged accumulator, a selection mechanism, an accumulator driving means controlled by said selection mechanism and operative to differentially drive said accumulator additively or subtractively, an ordinally arranged counter register, a counter actuator for operating said counter register to count cycles of machine operation additively or subtractively, means for shifting the relative ordinal positions of the accumulator and the accumulator driving means and the counter register and counter actuator, respectively, power means for operating said driving means, said actuator and said shifting means, a mechanism for multiplying a value set in said selection mechanism by a value registered in the counter register which comprises a first manual means for setting said counter actuator to operate said counter register subtractively and said driving means to operate said accumulator additively and for initiating continuous cycles of operation of said power means, a second manual means for setting said counter actuator to operate said counter register subtractively and said driving means to operate said accumulator subtractively and for initiating continuous cycles of operation of said power means, a sensing means operative to sense a tens-transfer between the respective orders of said counter register, and means operated by said sensing means when sensing a tens-transfer in a predetermined lower order to disable operation of said driving means and to enable operation of said shifting means and then reinitiate operation of said driving means in the adjacent order, means operated by each of said manual means for enabling operation of said sensing means, and another means operated by said sensing means when sensing a tens-transfer condition in the highest order to terminate machine operation.

15. In a calculating machine having an accumulator for registering a product, a selection mechanism, an accumulator driving means under the control of said selection mechanism for differentially driving said accumulator additively or subtractively, an ordinally arranged counter register, a counter actuator for operating said counter register to count the cycles of machine operation either additively or subtractively, means for shifting the relative ordinal positions of the accumulator and counter register with respect to said driving means and said actuator, and a cyclically operative power means for selectively operating said driving means and said actuator or said shifting means, the combination which comprises a first control key, means operated by said first control key for setting said counter actuator for subtractive operation and said driving means for additive operatoin and initiating repetitive cycles of operations of said power means, a second control key, means operated by said second control key for setting said counter actuator for subtractive operation and said driving means for subtractive operation and initiating repetitive cycles of operations of said power means, means conditioned by said keys and operated by a predetermined conditions in a predetermined order of said counter for terminating said repetitive cycles of operations in one relative ordinal position of the counter and accumulator with respect to said driving means and said actuator, respectively, for operating said shifting means, and for reinitiating operation of said driving means in the next ordinal position of the accumulator with respect to said accumulator driving means, and a second means conditioned by said keys and operated by a predetermined condition throughout said counter register for terminating operation of said power means.

References Cited in the file of this patent

UNITED STATES PATENTS

| | | |
|---|---|---|
| 967,821 | Naumann | Aug. 16, 1910 |
| 1,964,211 | Overbury | June 26, 1934 |
| 1,968,201 | Hamann | July 31, 1934 |
| 2,170,406 | Hamann | Aug. 22, 1939 |
| 2,288,323 | Pott | June 30, 1942 |
| 2,371,752 | Friden | Mar. 20, 1945 |
| 2,382,661 | Pott | Aug. 14, 1945 |
| 2,388,209 | Friden | Oct. 30, 1945 |